United States Patent [19]
Antinone et al.

[11] Patent Number: 5,681,600
[45] Date of Patent: Oct. 28, 1997

[54] STABILIZATION OF LIQUID NUTRITIONAL PRODUCTS AND METHOD OF MAKING

[75] Inventors: Michael Joseph Antinone, Gahanna, Ohio; Michelle Marie Smith, Athens, Ga.; Kent Lee Cipollo, Westerville; Terrence Bruce Mazer, Reynoldsburg, both of Ohio

[73] Assignee: Abbott Laboratories, Abbott Park, Ill.

[21] Appl. No.: 573,740

[22] Filed: Dec. 18, 1995

[51] Int. Cl.⁶ .................. A23L 1/05; A23L 1/20; A23L 1/304
[52] U.S. Cl. ............ 426/74; 426/590; 426/634; 426/656; 426/804
[58] Field of Search .............. 426/590, 74, 634, 426/656, 804

[56] References Cited

U.S. PATENT DOCUMENTS

| | | | |
|---|---|---|---|
| 4,533,254 | 8/1985 | Cook et al. | 366/176 |
| 5,021,245 | 6/1991 | Borschel et al. | 426/2 |
| 5,085,883 | 2/1992 | Garleb et al. | 426/590 |
| 5,104,674 | 4/1992 | Chen et al. | 426/573 |
| 5,330,972 | 7/1994 | Cope | 426/656 |
| 5,508,172 | 4/1996 | Wong et al. | 426/634 |

FOREIGN PATENT DOCUMENTS

| | | |
|---|---|---|
| 0265772A | 4/1988 | European Pat. Off. . |
| WO91/19692 | 12/1991 | WIPO . |
| WO92/19252 | 11/1992 | WIPO . |
| WO94/08473 | 4/1994 | WIPO . |
| WO 9526646A | 12/1995 | WIPO . |

OTHER PUBLICATIONS

Database WPI, Section Ch, Week 9524, Derwent Publications Ltd., London, GB: AN 95–182029, XP002030363 & JP 07 099 930 A (Saneigen FFI KK), 18 Apr. 1995.

*Primary Examiner*—Helen Pratt
*Attorney, Agent, or Firm*—Lonnie R. Drayer; Thomas D. Brainard; Donald O. Nickey

[57] ABSTRACT

A method of making a stable liquid nutritional product is disclosed. The method includes the steps of forming a protein solution, a carbohydrate solution, and an oil blend, adding a small amount of a nutritional ingredient containing soy polysaccharide as a source of dietary fiber to one of these, combining appropriate quantities of these solutions, and heat processing and microfluidizing the combined solution. The amount of the nutritional ingredient containing soy polysaccharide as a source of dietary fiber is preferably less than 6,500 ppm, and is most preferably between 3,000 and 6,000 ppm of the final product.

20 Claims, 21 Drawing Sheets

5,681,600

STABILIZATION OF LIQUID NUTRITIONAL PRODUCTS AND METHOD OF MAKING

BACKGROUND OF THE INVENTION

This invention relates generally to liquid nutritional products, and more particularly, to a method of making a liquid nutritional product using microfluidization.

Liquid nutritional products typically contain protein, fats, carbohydrates, minerals, vitamins and water. Examples of proteins that can be used in liquid nutritional products include, but are not limited to, caseinates, whey proteins, and soy proteins. Fats which could be used include, but are not limited to, corn oil, canola oil, soybean oil, high oleic safflower oil and marine oil. Carbohydrates include, but are not limited to, sucrose, fructose, corn syrup, and maltodextrin.

Additional components may be added depending upon the desired physiological effect of the nutritional product. Nutritional requirements may necessitate the addition of dietary fiber, as shown in U.S. Pat. No. 5,085,883, Garleb et al. Dietary fiber is understood to be all of the components of a food that are not broken down by enzymes in the human digestive tract to produce small molecular compounds which are then absorbed into the bloodstream. These components are mostly celluloses, hemicelluloses, pectin, gums, mucilages, lignin and lignin material varying in different plants according to type and age. These fibers differ significantly in their chemical composition and physical structure and consequently their physiological function.

One type of dietary fiber which has been used in liquid nutritional products is soy polysaccharide. For example, in U.S. Pat. No. 5,021,245, Borschel et al., soy polysaccharide was included in an infant formula for the treatment of colic. The amount of soy polysaccharide added to the infant formula was in the range of 0.3 to 1.4% by weight.

Some components of liquid nutritional products are difficult to maintain in solution. Examples of such components include, but are not limited to, calcium, phosphorus, and cocoa. Although the literature does not contain much discussion of it, the existence of the problem can be inferred from the search for more soluble calcium compounds such as described in WO9119692, WO9219251, WO9408473.

Over time, some-components in liquid nutritional products may come out of solution or degrade, thereby reducing the amount of that component available in the product. In order to ensure that the liquid nutritional product maintains the required amount of each component, the product must be overfortified with the component. This overfortification, while necessary to meet label claims, adds to the cost of producing the liquid nutritional product.

Typically, stabilizers are added to the product to help maintain these components in solution. Examples of stabilizers which could be used include, but are not limited to, xanthan gum, and iota and kappa carrageenan.

The use of carrageenan in nutritional products presents a number of difficulties. The use of carrageenan in nutritional products is more highly regulated internationally than it is in the United States. Currently, the European Community does not permit the use of carrageenan in infant formulas. The United Kingdom allows the use of carrageenan in nutritional products, but has classified it as a Group B (provisional acceptance) substance. In addition, because of a perceived association between carrageenan and inflammatory bowel disease (IBD), Germany requires that all products containing carrageenan have a warning label which states: "Contains Carrageenan: not suitable for patients with inflammatory bowel disease."

Therefore, it would be desirable to provide an alternative to the use of carrageenan as a stabilizer in liquid nutritional products.

This, together with other objects and advantages of the invention, will become more readily apparent to those skilled in the art when the following general statements and descriptions are read in the light of the appended drawings.

DESCRIPTION OF THE INVENTION

Figure 1:
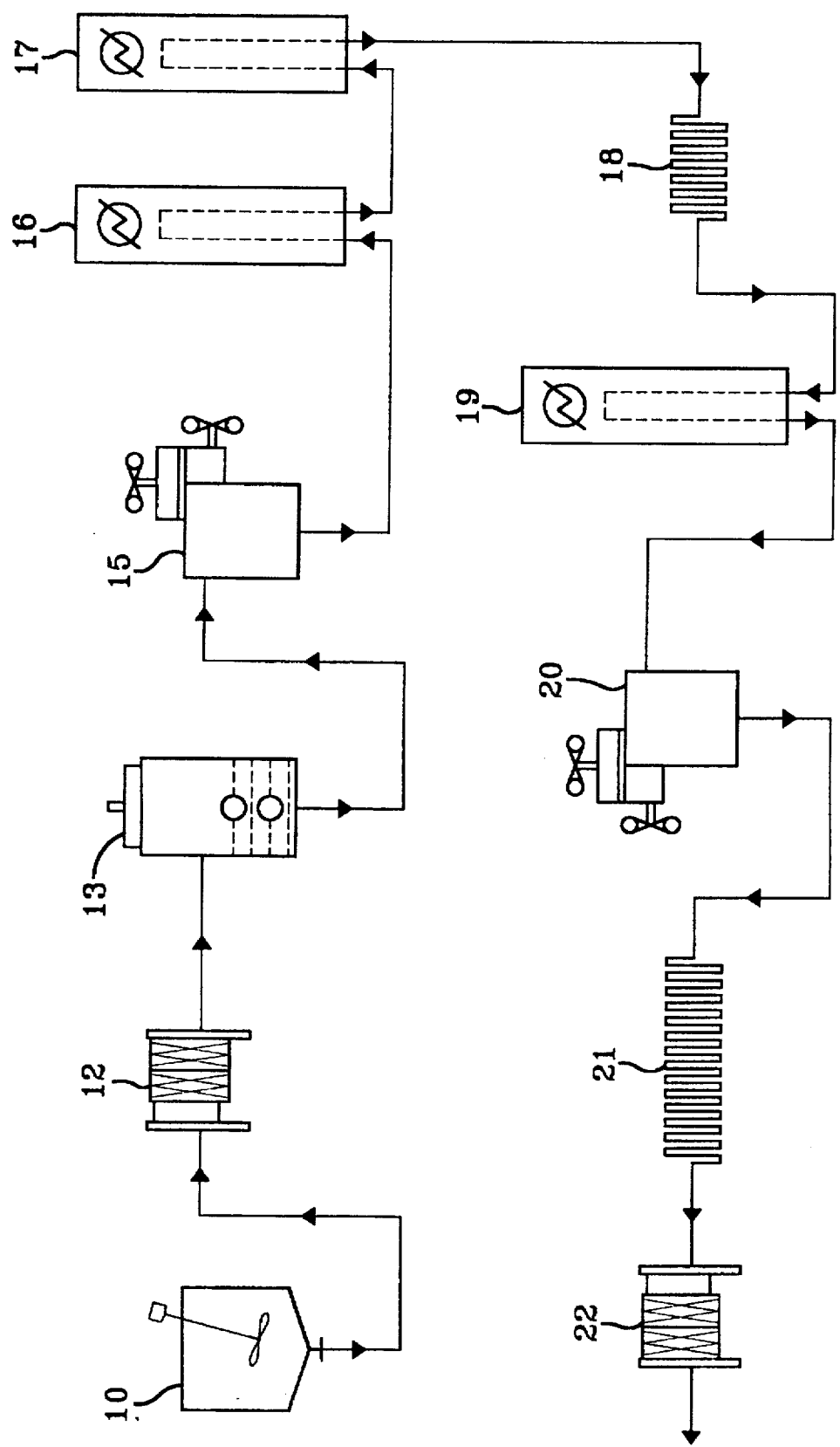
FIG. 1 is a schematic of a prior art process for manufacturing a liquid nutritional product.

A method of manufacturing a stable liquid nutritional product is disclosed. The method comprises dispersing a protein source in water, thereby forming a protein solution, dissolving carbohydrates in water, thereby forming a carbohydrate solution, mixing together one or more oils, thereby forming an oil blend, mixing a small amount of a nutritional ingredient containing soy polysaccharide as a source of dietary fiber into a mixture selected from the group consisting of the protein solution, the carbohydrate solution, and the oil blend, combining appropriate quantities of the protein solution, the carbohydrate solution, and the oil blend to make a combined solution, and heat processing and microfluidizing the combined solution.

The term "a small amount" of a nutritional ingredient containing soy polysaccharide as a source of dietary fiber, as used here and in the claims, means an amount less than 10,000 ppm of a nutritional ingredient containing soy polysaccharide in the combined solution.

Carbohydrates may be added to the protein solution. Minerals are preferably added to the carbohydrate solution. The nutritional ingredient containing soy polysaccharide as a source of dietary fiber is preferably added to the oil blend, and oil-soluble vitamins are also preferably added to the oil blend. The combined solution can be diluted to form a final product. The amount of a nutritional ingredient containing soy polysaccharide as a source of dietary fiber is preferably less than 6,500 ppm, and is most preferably between 3,000 and 6,000 ppm in the final product.

A method of manufacturing a stable liquid nutritional product containing calcium is also disclosed. The method comprises dispersing a protein source in water, thereby forming a protein solution, dissolving carbohydrates in water, thereby forming a carbohydrate solution, mixing together one or more oils, thereby forming an oil blend, adding a calcium-containing compound to the carbohydrate solution, mixing a small amount of a nutritional ingredient containing soy polysaccharide as a source of dietary fiber into a mixture selected from the group consisting of the protein solution, the carbohydrate solution, and the oil blend, combining appropriate quantities of the protein solution, the carbohydrate solution, and the oil blend, to make a combined solution, heat processing and homogenizing the combined solution, and diluting the combined solution to form a final product, the final product having an initial calcium delivery of at least about 75% of the calcium added, and preferably at least about 90%. The homogenization can either be traditional homogenization or microfluidization.

Studies were performed using a base formulation. The base formulation is shown in Table 1. The ingredient quantities provided in Table 1 produce 1000 lb. batches. The batches used in the studies were 50 lb. batches. One skilled in the art would be able to determine the appropriate amounts of each ingredient to produce 50 lb. batches.

TABLE 1

| INGREDIENT | AMOUNT PER 1000 LB PRODUCT |
| --- | --- |
| Water | 768.451 lb* |
| Corn Syrup | 64.000 lb |
| Maltodextrin | 48.418 lb |
| Sugar (Sucrose) | 38.000 lb |
| Corn Oil | 34.150 lb |
| Sodium Caseinate | 27.921 lb |
| Soy Protein Isolate | 6.284 lb |
| Calcium Caseinate | 4.245 lb |
| Potassium Citrate | 2.045 lb |
| Magnesium Chloride | 1.672 lb |
| Soy Lecithin | 1.450 lb |
| Calcium Phosphate Tribasic | 1.370 lb |
| Sodium Citrate | 1.176 lb |
| Natural and Artificial Flavor | 1.083 lb |
| Potassium Chloride | 0.880 lb |
| Ascorbic Acid | 127.500 gm |
| Choline Chloride | 163.040 gm |
| Potassium Hydroxide - 45% | 89.250 gm |
| Ultratrace Mineral/Trace Mineral Premix | 68.258 gm |
| Zinc Sulfate, Monohydrate | 15.545 gm |
| Ferrous Sulfate, Monohydrate | 13.449 gm |
| Manganese Sulfate, Monohydrate | 3.692 gm |
| Cupric Sulfate, Pentahydrate | 1.991 gm |
| Sodium Molybdate, Dihydrate | 0.101 gm |
| Chromium Chloride, Hexahydrate | 0.098 gm |
| Sodium Selenite, Anhydrous | 0.036 gm |
| Maltodextrin + Citric Acid (carrier) | 33.346 gm |
| Water Soluble Vitamin Premix | 32.970 gm |
| Niacinamide | 12.371 gm |
| d-Calcium Pantothenate | 8.000 gm |
| Thiamine Hydrochloride | 2.043 gm |
| Pyridoxine Hydrochloride | 1.966 gm |
| Riboflavin | 1.596 gm |
| Cyanocobalamin | 0.006 gm |
| Biotin | 0.241 gm |
| Folic Acid | 0.277 gm |
| Maltodextrin (carrier) | 6.470 gm |
| Oil Soluble Vitamin Premix | 16.900 gm |
| Alpha-Tocopherol Vitamin E Acetate | 12.419 gm |
| Coconut Oil | 3.425 gm |
| Vitamin A Palmitate | 1.030 gm |
| Vitamin K Phylloquinone | 0.023 gm |
| Vitamin D3 | 0.003 gm |
| Potassium Iodide | 0.044 gm |
| Stabilizer | ** |

*The amount of water may vary slightly from batch to batch.
**The amount and type of stabilizer varied.

A carrageenan control was produced which contained 500 ppm carrageenan as a stabilizer and no nutritional ingredient containing soy polysaccharide. Other batches were produced which contained no carrageenan; instead, a nutritional ingredient containing soy polysaccharide as a stablizer was added in amounts ranging from 1,000 to 20,000 ppm. Finally, one batch was prepared as a no-stabilizer control which did not contain either carrageenan or a nutritional ingredient containing soy polysaccharide as a stabilizer.

The batches were produced according to the following procedure. The initial preparation steps for all of the batches were the same.

A protein solution is prepared by heating water in a tank to a temperature in the range of 140° to 160° F. Sodium caseinate is added to the water, and the mixture is agitated until the sodium caseinate is dispersed. When the protein is dispersed, corn syrup is added with agitation. The slurry is then maintained at a temperature in the range of 140° to 160° F with minimal agitation.

An oil blend is prepared by heating corn oil to 140° to 160° F. The lecithin and the oil soluble vitamin premix, which contains Vitamins A, D, E, and K, are added to the oil blend with agitation. The soy protein isolate and calcium caseinate are then added with agitation. The stabilizer is added with agitation. Carrageenan (500 ppm) was the stabilizer for the carrageenan control, while a nutritional ingredient containing soy polysaccharide was used for the other batches. The no-stabilizer control had no stabilizer at all. The temperature of the oil blend is maintained in the range of 140° to 160° F.

The particular nutritional ingredient containing soy polysaccharide as a source of dietary fiber used in the testing is Fibrim 300® from Protein Technologies International (St. Louis, Mo.). Fibrim 300® contains approximately 65–80% dietary fiber: As used here and in the claims, total dietary fiber is understood to be the sum of the soluble and insoluble dietary fiber determined using Association of Official Analytical Chemists (AOAC) method 991.43. The nutrient composition of Fibrim 300® as provided by the manufacturer is shown in Table 2.

TABLE 2

| Approximate Composition of FIBRIM 300® | |
|---|---|
| Nutrient | FIBRIM 300® per 100 g |
| Protein | 11.6 g |
| Fat | 1.0 g |
| Carbohydrate | 71.0 g |
| Ash | 6.5 g |
| Moisture | 6.5 g |
| Calcium | 440 mg |
| Phosphorus | 330 mg |
| Magnesium | 220 mg |
| Sodium | 250 mg |
| Potassium | 870 mg |
| Chloride | 170 mg |
| Iron | 12.0 mg |
| Zinc | 2.2 mg |
| Copper | 0.26 mg |
| Thiamin | 0.09 mg |
| Riboflavin | 0.22 mg |
| Pyridoxine | 0.008 mg |
| Niacin | 0.093 mg |
| Folic Acid | 5.47 mcg |
| Pantothenic Acid | 0.017 mg |
| Biotin | 0.054 mg |
| Choline | 85 mg |
| Inositol | 121 mg |
| Dietary Fiber | 78.2 g |

Furthermore, the fiber composition Fibrim, 300® has been analyzed by several investigators with the results of some of these analyses presented in Table 3. The varying percentages of the constituents are largely due to variation of the analytical methods and may also reflect possible batch to batch variation in the composition of the product over time.

TABLE 3

Composition of Soy Polysaccharide FIBRIM 300® by Various Investigators

| | STUDY | | | | |
|---|---|---|---|---|---|
| Constituent | #1 | #2 | #3 | #4 | #5 |
| | Percent Dry Weight | | | | |
| Total Dietary Fiber | 70.7 | 78.2 | 76.9 | 65.6 | 75.0 |
| Neutral Detergent Fiber | 30.4 | NA | NA | 49.5 | 40.0 |
| Acid Detergent Fiber | 13.7 | NA | NA | NA | NA |
| Lignin | 5.2 | 2.6 | NA | 0.5 | 0.5 |
| Soluble Dietary Fiber | NA | 4.8 | 3.8 | 1.3 | NA |
| Cellulose | 8.5 | NA | NA | 14.3 | 10.0 |

Sources of Data:

1-Independent analyses conducted in the lab of George Fahey, PhD, Department of Animal Sciences, University of Illinois. Analysis by methods of Goering, HK and Van Soest, PJ, "Forage Fiber Analyses Apparatus, Reagents, Procedures, and Some Applications", USDA-ARS Handbook No. 379, ARS, USDA Washington, 1970, Prosky, L. Asp. N-G Furda, I, et al. "Determination of Total Dietary Fiber in Foods and Food Products: Collaborative Study", J. Assoc. Off. Anal. Chem., 1985, and Li, BW and Andrews, KW, "Simplified Method for Determination of Total Dietary Fiber in Foods", J. Assoc. Off. Anal. Chem., 1988.

2-Shinnick, FL, Hess, RL, Fischer, MH and Marlett, JA, "Apparent Nutrient Absorption and Upper Gastrointestinal Transit with Fiber-Containing Enteral Feedings", Am. J. Clin. Nutr., 1989. Analysis by modification of Theander method, see Shinnick, FI, Longacre, MJ, Ink, SL, and Marlett, JA, "Oat Fiber: Composition vs. Physiological Function", J. Nutr., 1988.

3-Steinke, FH, "Composition and Nutritional Value of Fibrim® Soy Fiber (Soy Polysaccharide)", The Role of Dietary Fiber in Enteral Nutrition, Abbott Int'l. Ltd., Abbott Park, Ill, 1988. Analysis by method of Prosky, L., Asp, N-G, Furda, I, et al, "Determination of Total Dietary Fiber in Foods and Food Products: Collaborative Study," J. Assoc. Off. Anal. Chem., 1985.

4-Steinke, FH, "Composition and Nutritional Value of Fibrim® Soy Fiber (Soy Polysaccharide)", The Role of Dietary Fiber in Enteral Nutrition, Abbott Int'l, Ltd., Abbott Park, Ill., 1988. Analysis by method of Southgate, DAT, "The Measurement of Unavailable Carbohydrates: Structural Polysaccharides", Determination of Food Carbohydrates, Applied Science Publications Ltd, London, 1976.

5-Taper, Milam, RS, McCallister, MJ et al, "Mineral Retention in Young Men Consuming Soy-Fiber-Augmented Liquid-Formula Diets", Am. J. Clin. Nutr., 1988. Neutral detergent fiber analysis by the method of Van Soest, PJ and McQueen, KW, "The Chemistry and Estimation of Fiber", Proc. Nutr. Soc., 1973. Total dietary fiber analyzed by the method of Southgate, DAT, "Determination of Carbohydrates in Foods", J. Sci. Food Agric., 1969.

A carbohydrate solution is prepared by heating water in a tank to a temperature in the range of 140° to 160° F. The ultra trace mineral/trace mineral premix is added to the water and the mixture is agitated. The potassium citrate, sodium citrate, potassium chloride, magnesium chloride, potassium iodide, maltodextrin, sucrose, and calcium phosphate tribasic are added to the carbohydrate solution, preferably in that order, with agitation. The slurry is maintained with agitation at 140° to 160° F.

Figure 2:
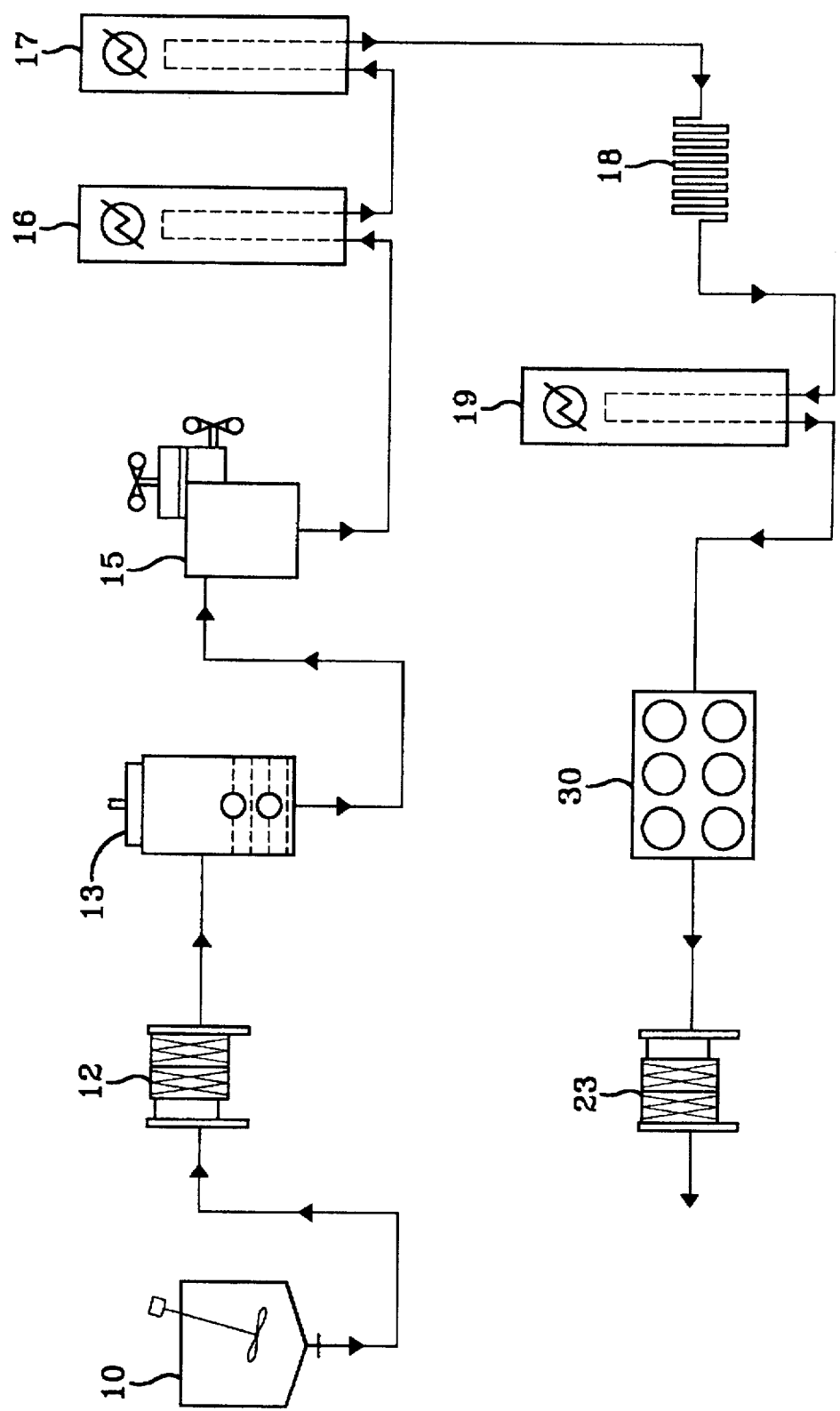
FIG. 2 is a schematic of a preferred process for manufacturing a liquid nutritional product.

In FIGS. 1 and 2, the protein solution, the carbohydrate solution, and the oil blend are combined in the appropriate ratios in the oil blend tank 10 with agitation. The protein solution is added first, followed by the oil blend. The resultant mixture is agitated for a minimum of 5 minutes before the carbohydrate solution is added. The combined solution is maintained at a temperature in the range of 120° to 140° F. The pH of each batch is adjusted to be in the range of 6.5 to 6.8 by adding a sufficient amount of potassium hydroxide to the blend if necessary.

The batch is then heat treated and homogenized. It is preferably subjected to Ultra High Temperature (UHT) pasteurization according to the following procedure. The batch is preheated in a heat exchanger 12 to a temperature in the range of 140° to 170° F. and then deaerated in a deaerator 13 at 10–15 inches Hg. The batch is then emulsified in an emulsifier 15 at 900 to 1,100 psig. The batch is heated in a first heat exchanger 16 to a temperature in the range of 210° to 230° F. The batch is then heated in a second heat exchanger 17 to a temperature in the range of about 293° to 297° F. and held in a hold tube 18 for about five seconds. The batch is cooled in a third heat exchanger 19 to a temperature in the range of about 160° to 175° F.

While the batch was subjected to UHT pasteurization, it is believed other pasteurization methods, such as High Temperature Short Time (HTST), would also work.

At this point, the treatment of the batches differed. Some batches were subjected to traditional homogenization. Traditional homogenization utilizes, for example, a Gaulin-type homogenizer. Typically, a Gaulin-type homogenizer operates at pressures of 1,000 to 4,000 psig. for the first stage, and 400 to 600 psig. for the second stage. In this case, the traditionally homogenized batches are homogenized in two-stage homogenizer 20 (model M3 by APV Crepaco, Inc., Tonawanda, N.Y.) at 3,900 to 4,100 psig. in the first stage, and 400 to 600 psig. in the second stage. The traditionally homogenized batches are held in a hold tube 21 at a temperature of 165° to 175° F. for 16 seconds. The batch is then cooled in a heat exchanger 22 to a temperature in the range of 34° to 44° F.

As shown in FIG. 2, instead of traditional homogenization, some batches were microfluidized in a microfluidizer 30 (model M-210B-EH Microfluidizer from Microfluidics International Co., Newton, Mass.) at pressures ranging from 6,000 to 15,000 psig. The batch is then cooled in a heat exchanger 23 to a temperature in the range of 34° to 44° F.

Figure 3:
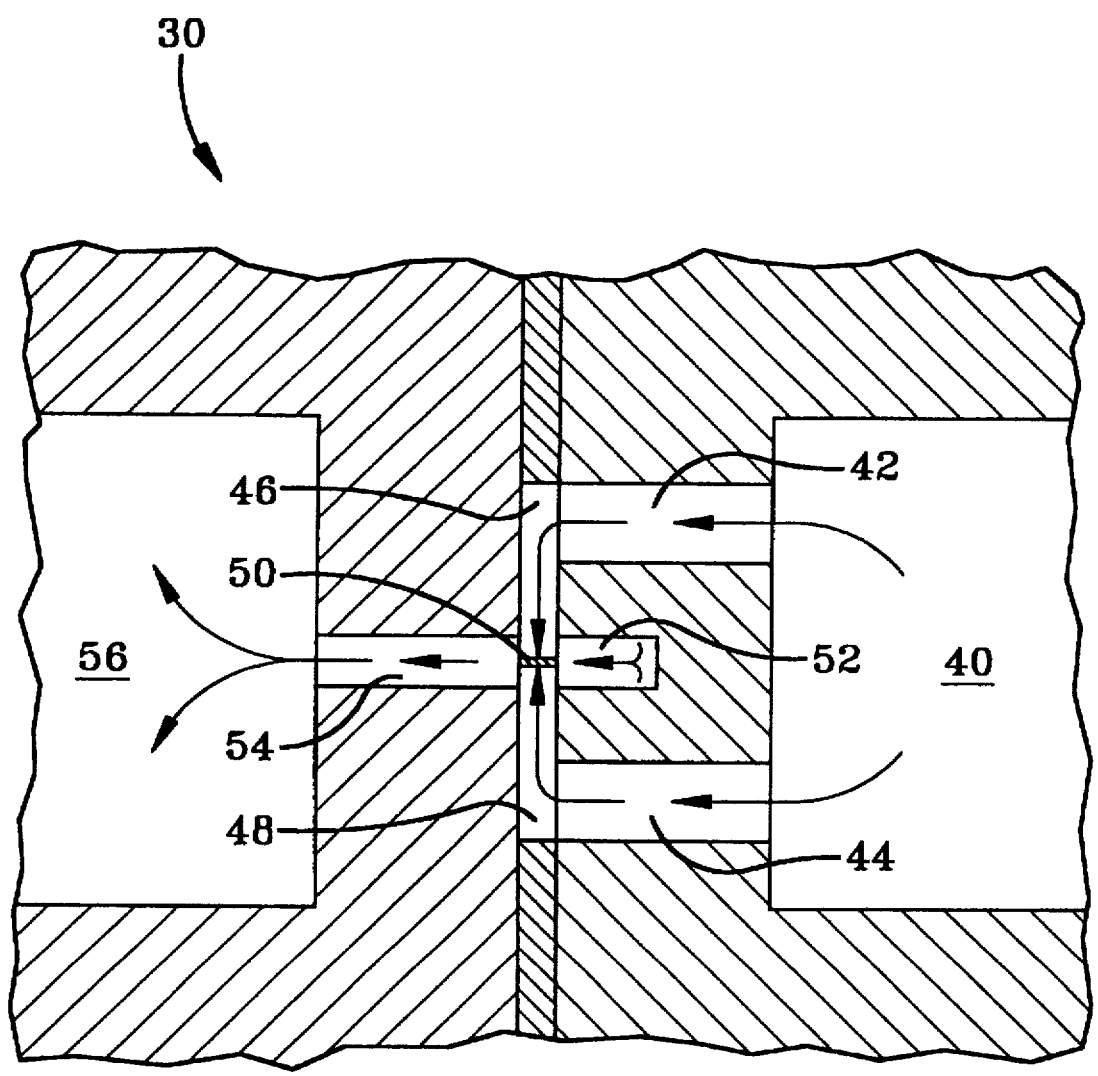
FIG. 3 is a fragmentary cross-sectional view of the interaction chamber of a microfluidizer.

Microfluidization is an alternative to traditional homogenization which utilizes the collision of two product streams at high pressures to produce a much more uniform particle size distribution (according to Microfluidics International Co.) and smaller average particle diameter (about 156 nm for the blend containing 4000 ppm of the nutritional ingredient containing soy polysaccharide, as compared with 218 nm for the traditionally homogenized batches also containing 4000 ppm of the nutritional ingredient containing soy polysaccharide, and 442 nm for the traditionally homogenized control containing carrageenan). The process and equipment used in microfluidization are described in detail in U.S. Pat. No. 4,533,254, Cook, et al., which is incorporated herein by reference for the purpose of teaching the microfluidization processes and equipment that may be used in the practice of the present invention. FIG. 3 shows a fragmentary cross-section of the interaction chamber of a microfluidizer 30 as described in U.S. Pat. No. 4,533,254. The liquid is introduced under pressure from a central passage 40 into outer channels 42 and 44. The fluid flows from channels 42 and 44 into nozzles 46 and 48. The sheets of liquid ejected from the nozzles 46 and 48 interact along an interaction front 50. The emulsion product of the interaction is directed into the relatively low pressure zones of turbulence in central groove 52 and in that portion of slotted groove 54 adjacent interaction front 50. The fluid then flows out slotted groove 54 into a discharge channel 56.

The remaining ingredients were then added, including water soluble vitamins and flavors in the form of solutions. The resulting batch was diluted to the specified total solids range of the product with the correct amount of water. The pH level of the product was adjusted to the appropriate level (6.45–6.75) with potassium hydroxide, if necessary. Cans were then filled with the product, seamed with an automatic seamer, and sterilized in a retort. However, it is understood that the product could be packaged into any suitable container and sterilized by any suitable procedure in the practice of the present invention.

Figure 4:
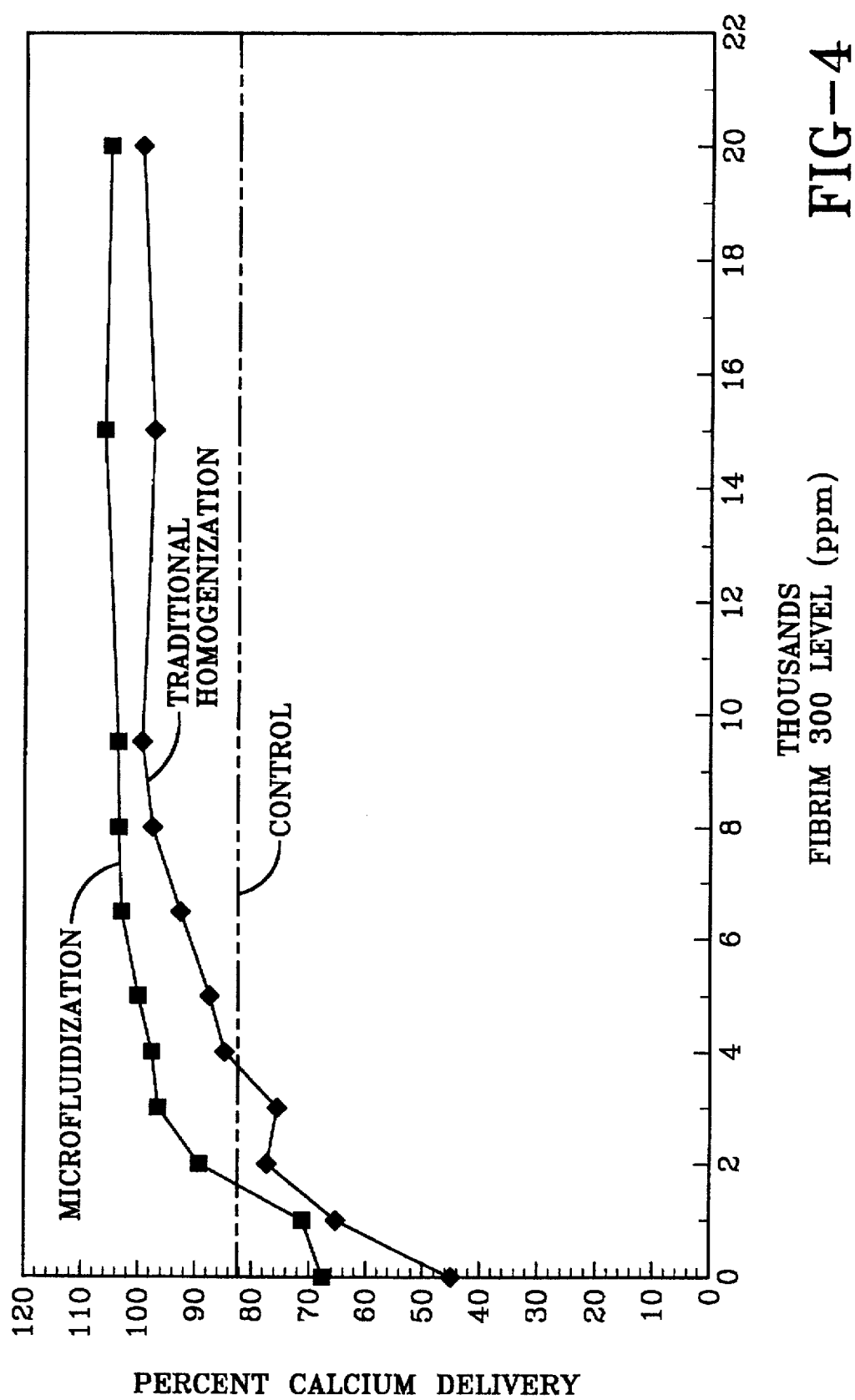
FIG. 4 is a chart showing a comparison of the effects of microfluidization and traditional homogenization on initial calcium delivery at different levels of a nutritional ingredient containing soy polysaccharide as a source of dietary fiber.

FIG. 4 shows a comparison of the effect of microfluidization and traditional homogenization on initial calcium delivery. Initial calcium delivery, as used here and in the claims, means calcium delivery as tested 10 to 14 days after production of the product. Calcium delivery is tested in the following manner. A supply container is connected to a pump, and a tube with a 0.074 inch inside diameter and a length of about 45 inches is also connected to the pump. The supply container is placed so that its outlet is 36 inches above the height of the end of the tube. The tube is arranged so that a portion of it is 12 inches above the height of the end of the tube. No part of the tube should be lower than the height of the end of the tube. There is a clamp on the tube to restrict flow. A collection container is placed at the end of the tube.

The product is shaken and poured into the supply container. The pump is set at 30 cc/hr for 8 oz. samples, or 50 cc/hr for samples larger than 8 oz. The clamp is opened, and the pump turned on. All of the product is fed through the system and collected in the collection container. The collected product is stirred to disperse any sediment material evenly. A sample is then analyzed for calcium. Calcium delivery as a percentage of fortification is calculated as follows: (amount of calcium in sample/total theoretical calcium in the batch)×100. Calcium delivery was reported as fortification delivery because the calcium content was not adjusted to account for the calcium present in the Fibrim 300® (an average of approximately 7 mg calcium/g soy polysaccharide as tested by Ross Laboratories). Therefore, each batch had a slightly different fortification rate.

In FIG. 4, the first point on each curve represents the no-stabilizer control, which did not contain either the nutritional ingredient containing soy polysaccharide or carrageenan. The results show that increasing the amount of the nutritional ingredient containing soy polysaccharide up to about 8,000 ppm generally increases calcium delivery for the traditionally homogenized batch. Calcium delivery then leveled off.

A similar increase and leveling off appears for the microfluidized batch. However, the microfluidized batch has a higher calcium delivery than the traditionally homogenized batch. In addition, the leveling off occurs at a lower level of the nutritional ingredient containing soy polysaccharide as a source of dietary fiber, about 5,000 ppm. than for the traditionally homogenized batch.

The carrageenan control, which contained 500 ppm carrageenan and which was traditionally homogenized, had an initial calcium delivery of about 82%. As shown in the graph, the microfluidized batch exceeded the initial calcium delivery of the carrageenan control above 2,000 ppm of the nutritional ingredient containing soy polysaccharide. The traditionally homogenized batch exceeded the initial calcium delivery of the carrageenan control above 4,000 ppm.

Figure 5:
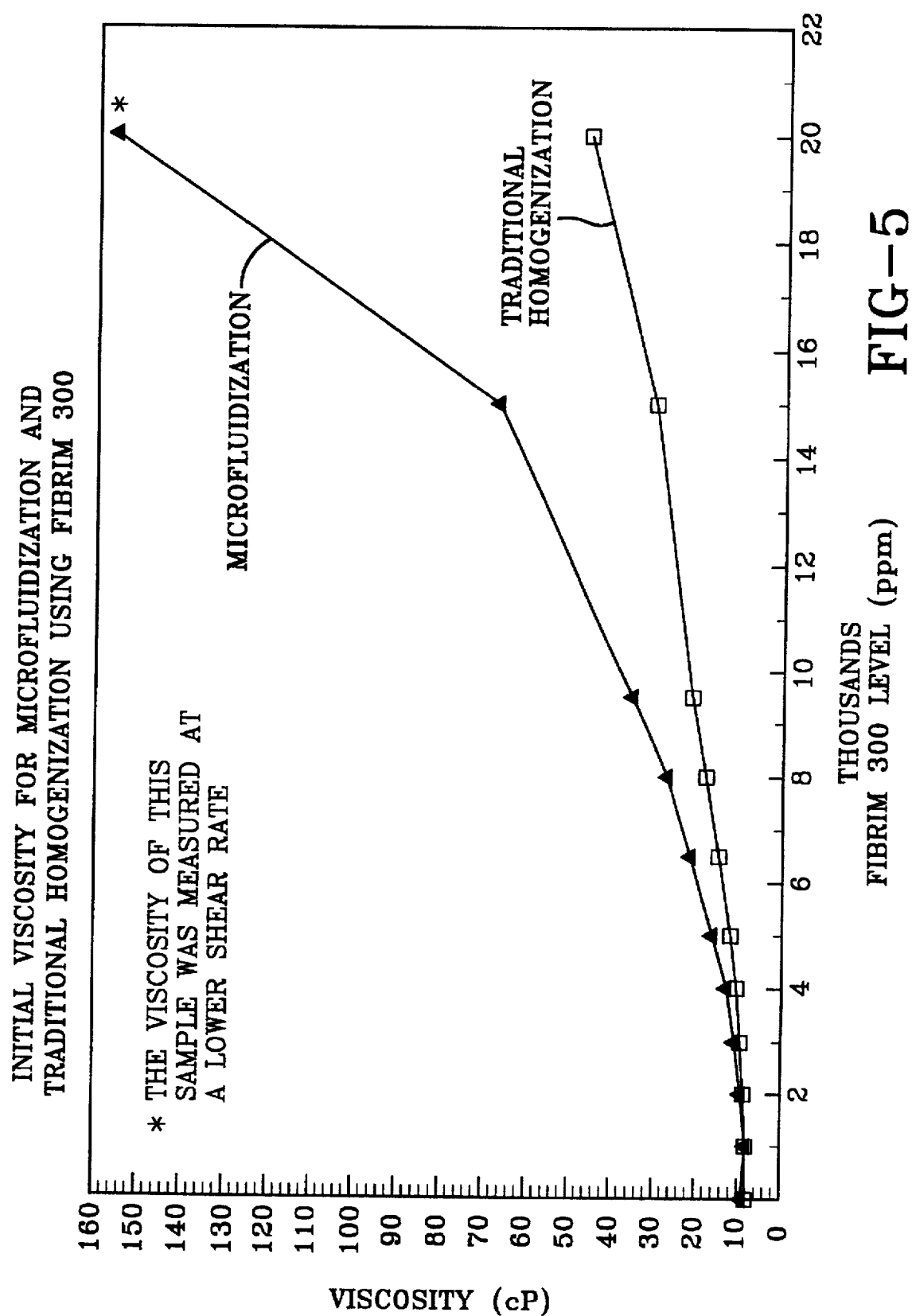
FIG. 5 is a chart showing a comparison of the effects of microfluidization and traditional homogenization on initial viscosity at different levels of a nutritional ingredient containing soy polysaccharide as a source of dietary fiber.

FIG. 5 shows the effect of the amount of the nutritional ingredient containing soy polysaccharide on initial viscosity for both traditionally homogenized and microfluidized batches. Initial viscosity was tested about 4 days after production of the product. Again, the first point on each curve represents the no-stabilizer control, which did not contain either the nutritional ingredient containing soy polysaccharide or carrageenan. The viscosity of both the traditionally homogenized batch and the microfluidized batch increased slowly as the amount era nutritional ingredient containing soy polysaccharide increased to 9,500 ppm. The viscosity increased rapidly above 9,500 ppm of the nutritional ingredient containing soy polysaccharide for both batches, but much more rapidly for the microfluidized batch. A viscosity of less than about 100 cP is preferred for ease of processing, although higher viscosities may be acceptable.

Figure 6:
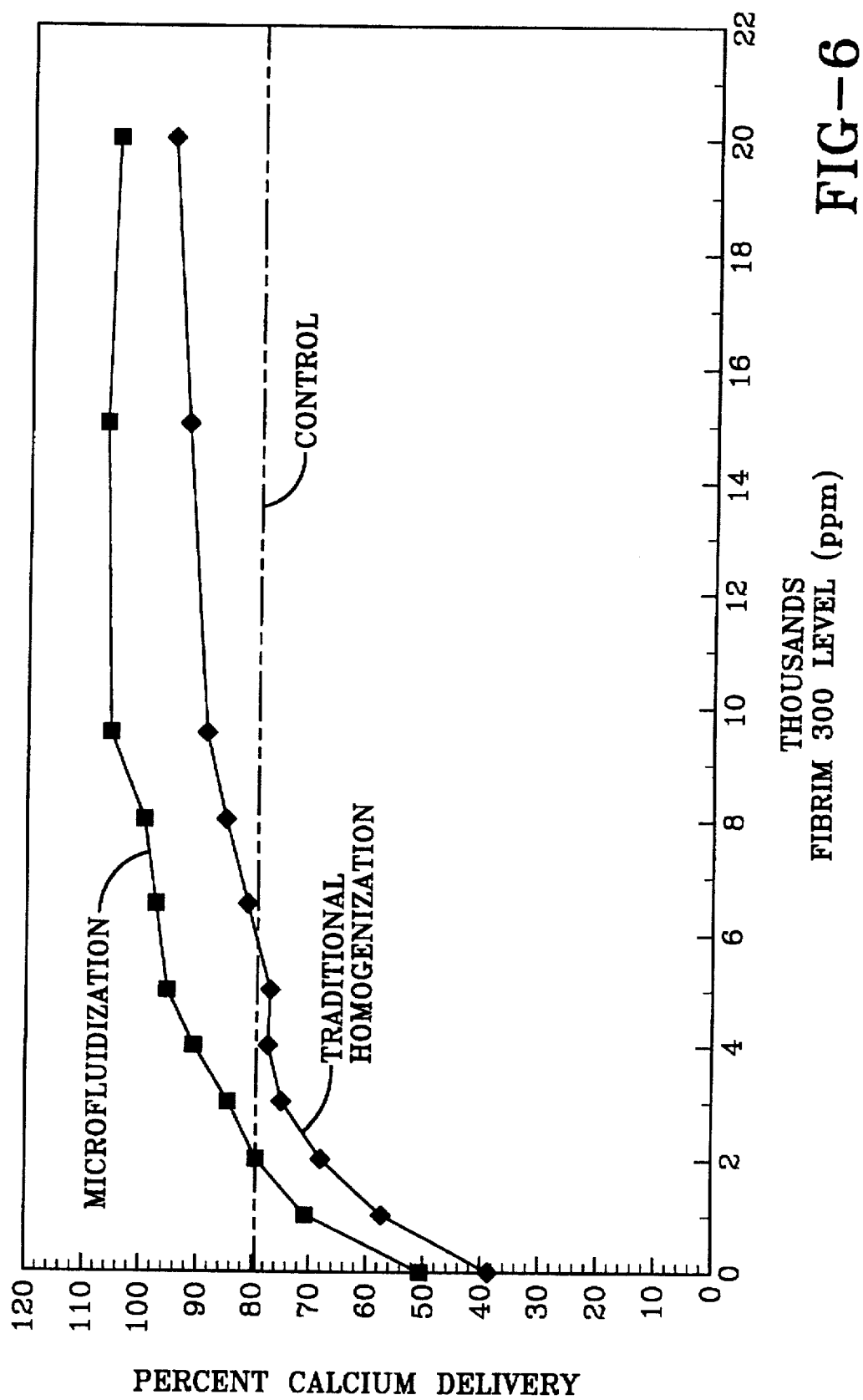
FIG. 6 is a chart showing a comparison of the effects of microfluidization and traditional homogenization on 1 month calcium delivery at different levels of a nutritional ingredient containing soy polysaccharide as a source of dietary fiber.

FIG. 6 shows the calcium delivery for the microfluidized and traditionally homogenized batches after 1 month. The first point on each curve represents the no-stabilizer control, which did not contain either the nutritional ingredient containing soy polysaccharide or carrageenan. The calcium delivery of the carrageenan control after 1 month is about 79%. The calcium delivery of the microfluidized batch exceeds this value above about 2,000 ppm of the nutritional ingredient containing soy polysaccharide, while the traditionally homogenized batch requires about 6,500 ppm.

Figure 7:
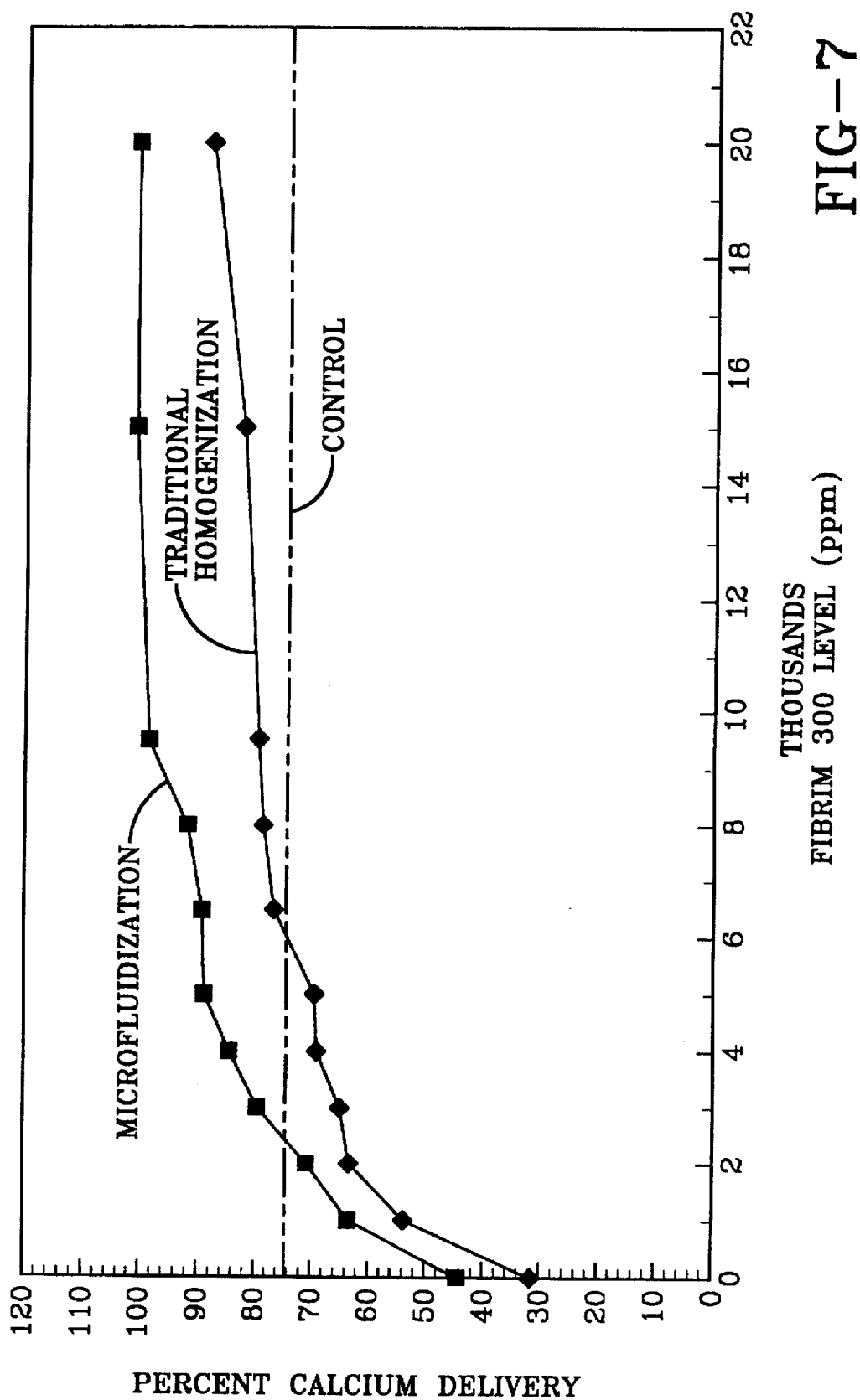
FIG. 7 is a chart showing a comparison of the effects of microfluidization and traditional homogenization on 2 month calcium delivery at different levels of a nutritional ingredient containing soy polysaccharide as a source of dietary fiber.

FIG. 7 shows the calcium delivery after 2 months. The first point on each curve represents the no-stabilizer control, which did not contain either the nutritional ingredient containing soy polysaccharide or carrageenan. The calcium delivery of the carrageenan control is about 74% after 2 months. It takes over 3,000 ppm of the nutritional ingredient containing soy polysaccharide for the microfluidized batch to exceed the calcium delivery of the carrageenan control, and about 6,500 ppm for the traditionally homogenized batch.

Figure 8:
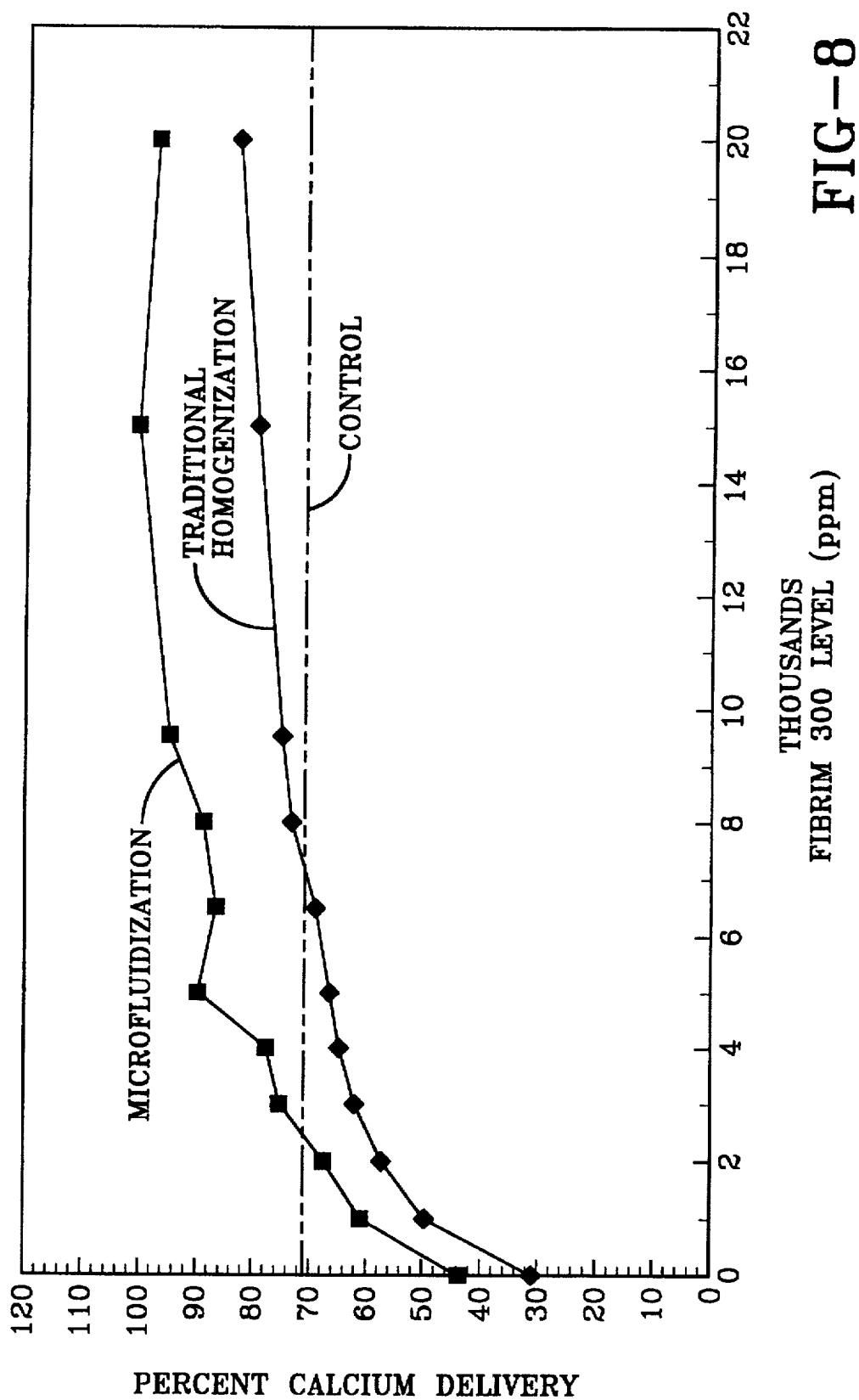
FIG. 8 is a chart showing a comparison of the effects of microfluidization and traditional homogenization on 3 month calcium delivery at different levels of a nutritional ingredient containing soy polysaccharide as a source of dietary fiber.

FIG. 8 shows the 3 month calcium delivery. The first point on each curve represents the no-stabilizer control which did not contain either the nutritional ingredient containing soy polysaccharide or carrageenan. The calcium delivery for the carrageenan control after 3 months is about 71%. For the microfluidized batch to exceed this calcium delivery, about 2,500 ppm of the nutritional ingredient containing soy polysaccharide is required. The traditionally homogenized batch requires about 7,000 ppm of the nutritional ingredient containing soy polysaccharide.

Figure 9:
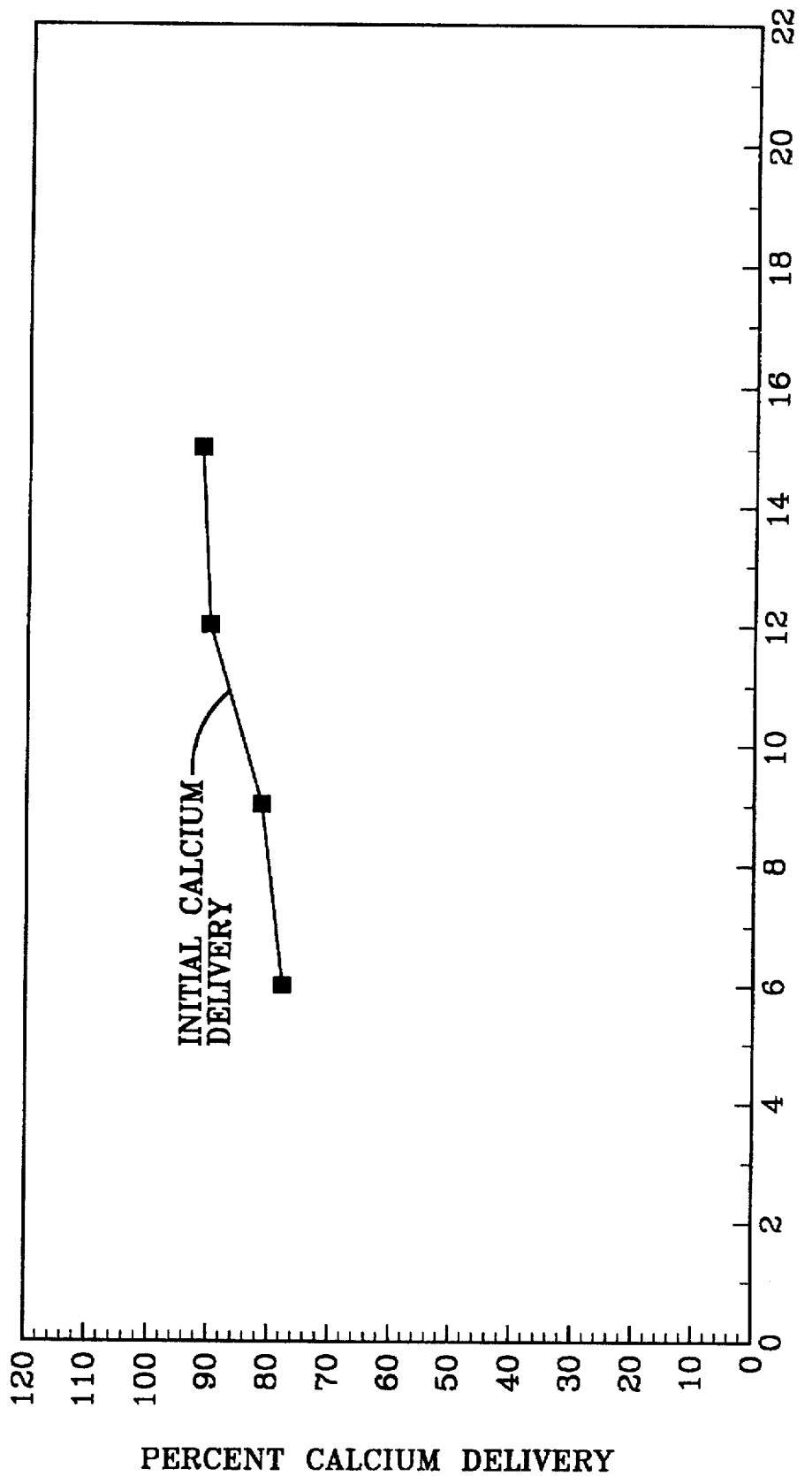
FIG. 9 is a chart showing initial calcium delivery for microfluidization at various pressures and 4000 ppm of a nutritional ingredient containing soy polysaccharide as a source of dietary fiber.
Figure 10:
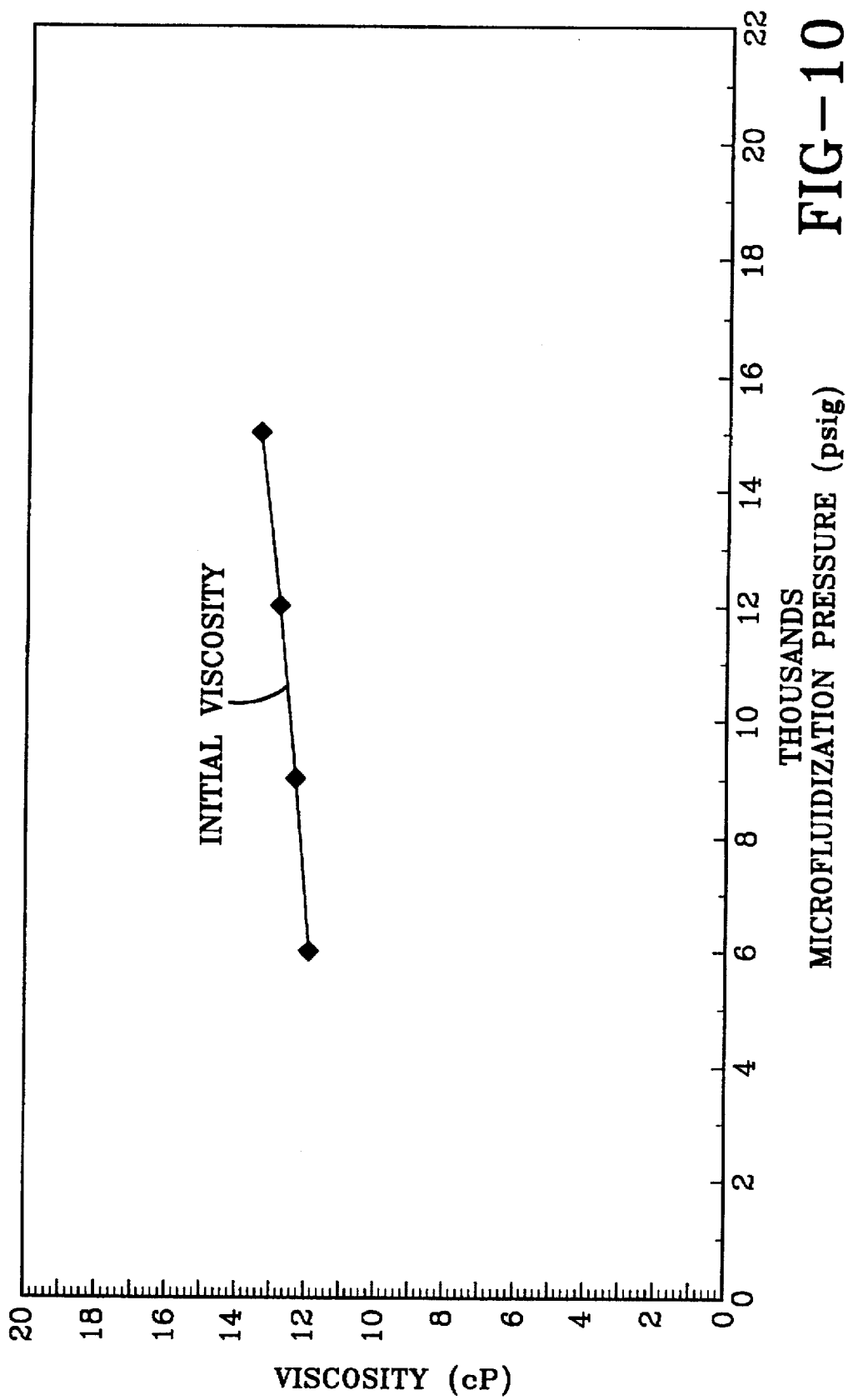
FIG. 10 is a chart showing initial viscosity for microfluidization at various pressures and 4000 ppm of a nutritional ingredient containing soy polysaccharide as a source of dietary fiber.

FIGS. 9 and 10 show the effect of increasing the pressure of the microfluidization on initial calcium delivery and initial viscosity of a batch containing 4,000 ppm of the nutritional ingredient containing soy polysaccharide as a source of dietary fiber. Both initial calcium delivery and initial viscosity increase with increasing pressure.

Figure 11:
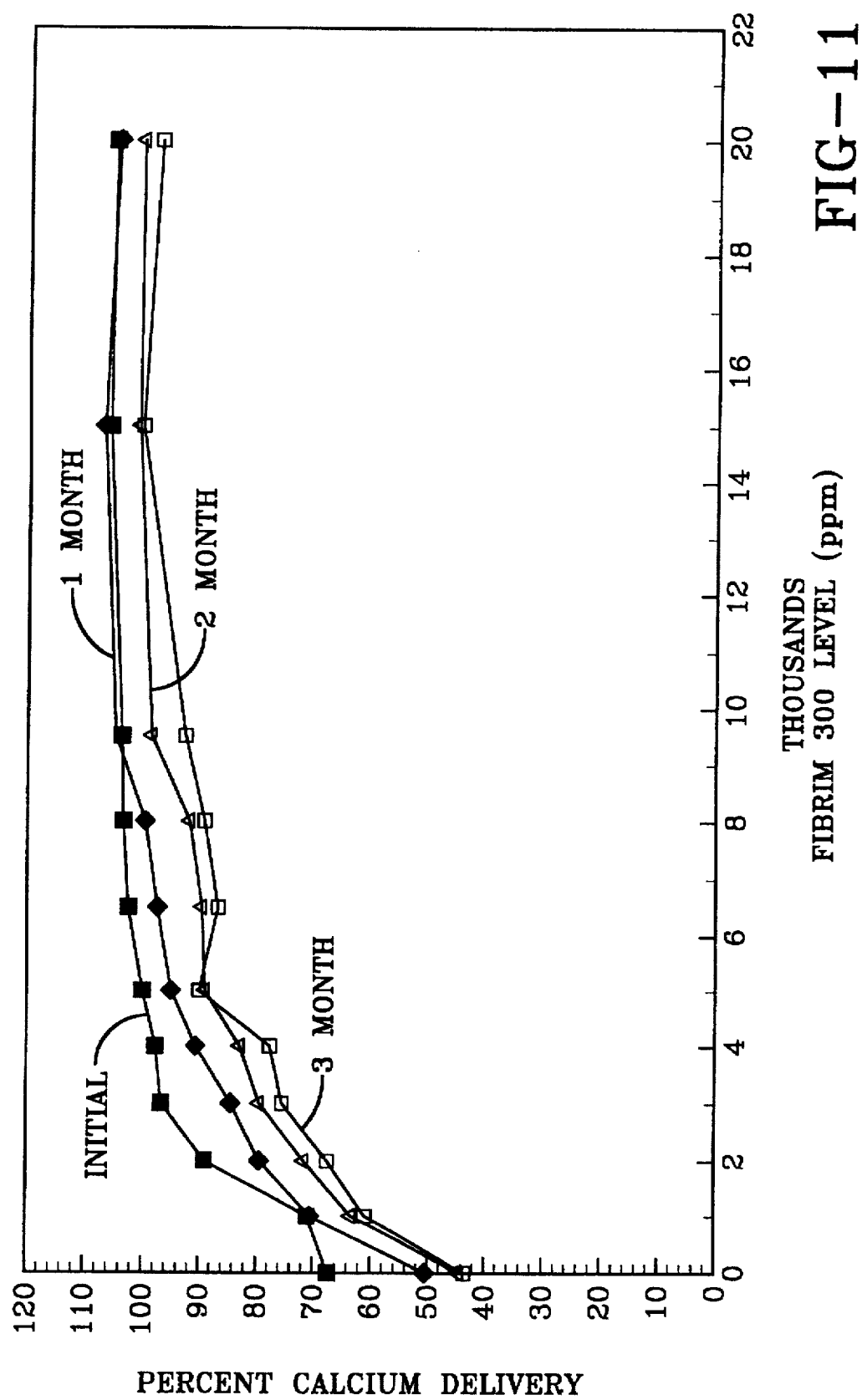
FIG. 11 is a chart showing a comparison of initial, 1 month, 2 month, and 3 month calcium delivery for microfluidization at different levels of a nutritional ingredient containing soy polysaccharide as a source of dietary fiber.

FIG. 11 compares the initial, 1 month, 2 month, and 3 month calcium delivery data for microfluidized batches. The first point on each curve represents the no-stabilizer control which did not contain either the nutritional ingredient containing soy polysaccharide or carrageenan. Calcium delivery generally increases with the amount of the nutritional ingredient containing soy polysaccharide up to about 6,500 ppm where it begins to level off. The initial calcium delivery is higher than at 1, 2, or 3 months. The 2 and 3 month calcium deliveries are comparable.

Figure 12:
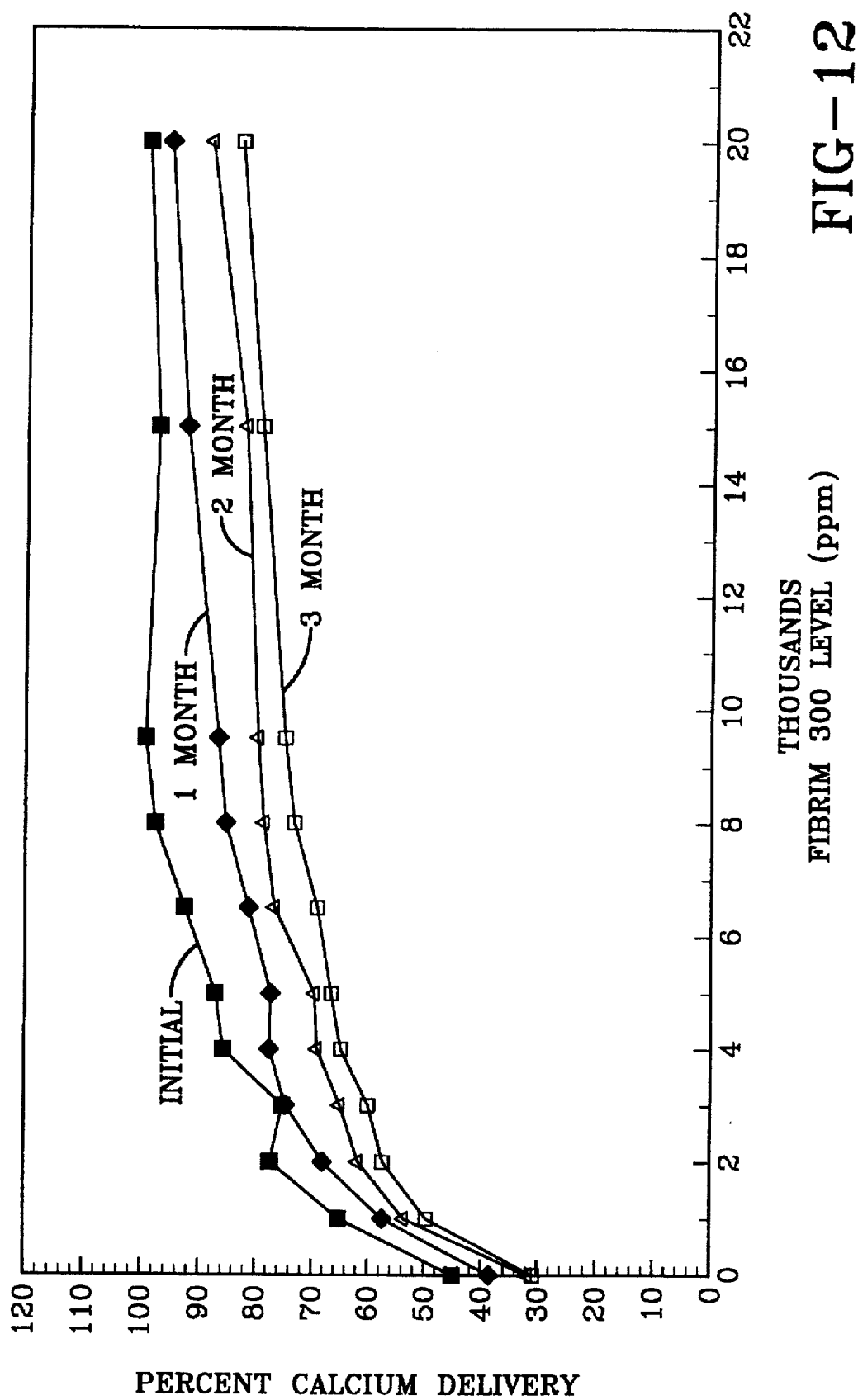
FIG. 12 is a chart showing a comparison of initial, 1 month, 2 month, and 3 month calcium delivery for traditional homogenization at different levels of a nutritional ingredient containing soy polysaccharide as a source of dietary fiber.

FIG. 12 shows a similar comparison for the traditionally homogenized batches. Again, the calcium delivery increases with the amount of the nutritional ingredient containing soy polysaccharide up to about 9,500 ppm where it begins to level off. The initial calcium delivery is higher than at 1, 2, or 3 months. Most of the loss in calcium delivery occurs between the initial testing and the testing at 1 month. The 2 and 3 month calcium deliveries are comparable.

Flavor testing was conducted by specially trained flavor testers on samples that were approximately one month old. Flavor intensity was rated on a 3 point scale using half step increments, where 1=slight, 2=moderate, and 3=strong. Typical soy polysaccharide flavor ("pasty, starchy, gluey") was not noticeable until the level of the nutritional ingredient containing soy polysaccharide was 6,500 ppm or above. Samples containing 1,000 to 5,000 ppm of the nutritional ingredient containing soy polysaccharide were not described as having a typical soy polysaccharide flavor, although they did possess a "cardboard-like" flavor with an intensity of 0.5 to 1. Samples containing at least 6,500 ppm of the nutritional ingredient containing soy polysaccharide were characterized as "pasty, starchy, gluey", with an intensity of 1 to 2 and "gritty/particulate" with an intensity of 1.5 to 2.

The color of the blends was also evaluated. Agtron® color scores are measured on a 100 point scale. The lower the number, the darker the color. The average Agtron® color score for the microfluidized blends was 35, as compared to 43 for the control blends. Tests on other formulations have shown an average decrease of 4 to 10 units for microfluidized blends over traditionally homogenized control blends. While this color difference does not affect the performance of the product, it may not be desirable in some products.

Figure 13:
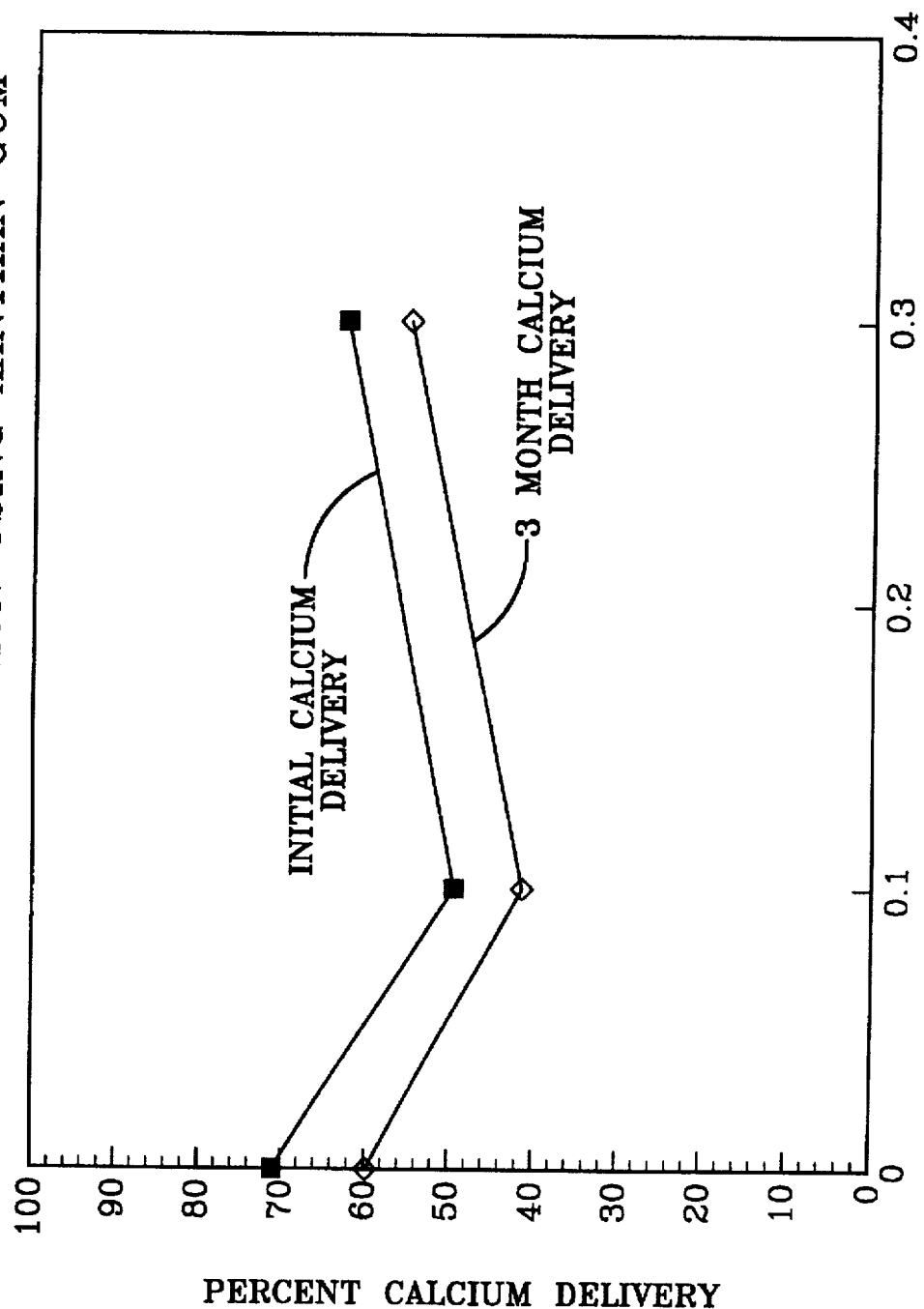
FIG. 13 is a chart showing a comparison of initial and 3 month calcium delivery for microfluidization at different levels of xanthan gum.
Figure 14:
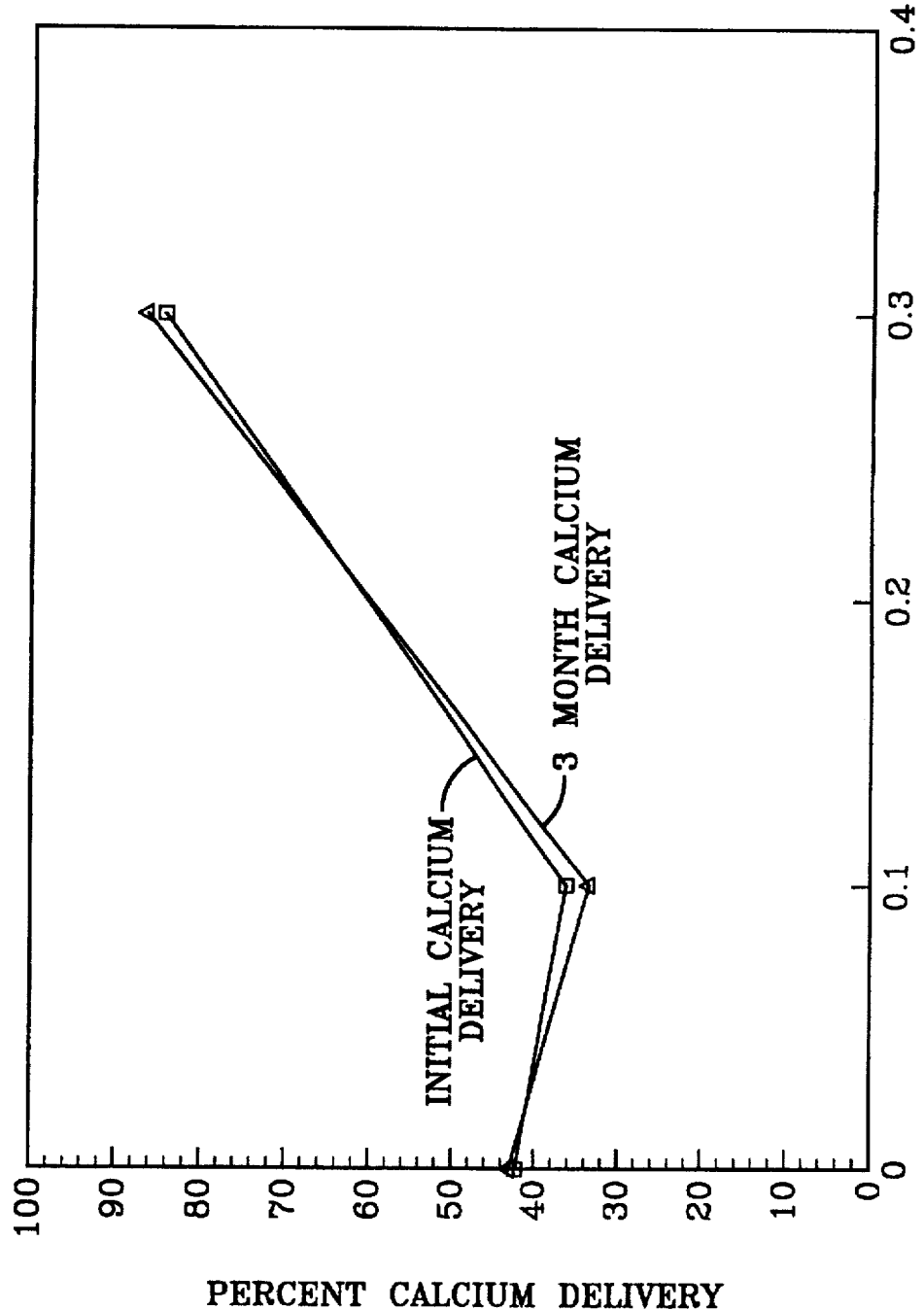
FIG. 14 is a chart showing a comparison of initial and 3 month calcium delivery for traditional homogenization at different levels of xanthan gum.
Figure 15:
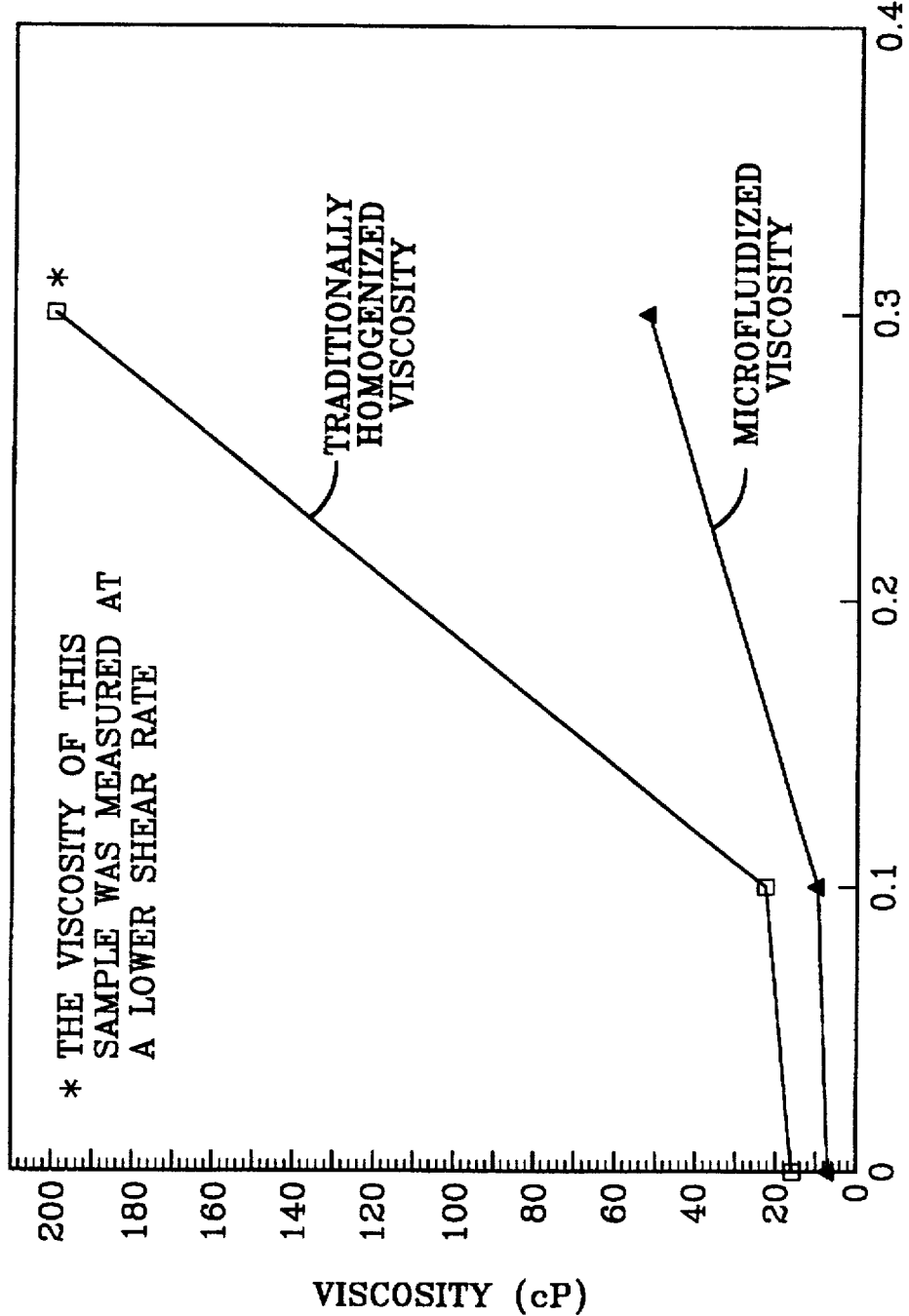
FIG. 15 is a chart showing a comparison of initial viscosity for microfluidization and traditional homogenization at different levels of xanthan gum.

Similar experiments were conducted using other dietary fibers and stabilizers. FIGS. 13 and 14 show the initial and 3 month calcium delivery for microfluidized and traditionally homogenized batches containing xanthan gum. FIG. 15 shows the initial viscosity for the microfluidized and traditionally homogenized batches containing xanthan gum. The xanthan gum was unable to provide acceptable calcium delivery at low enough viscosity. In FIGS. 13, 14, and 15, the batches which do not contain any xanthan gum are the carrageenan controls.

Figure 16:
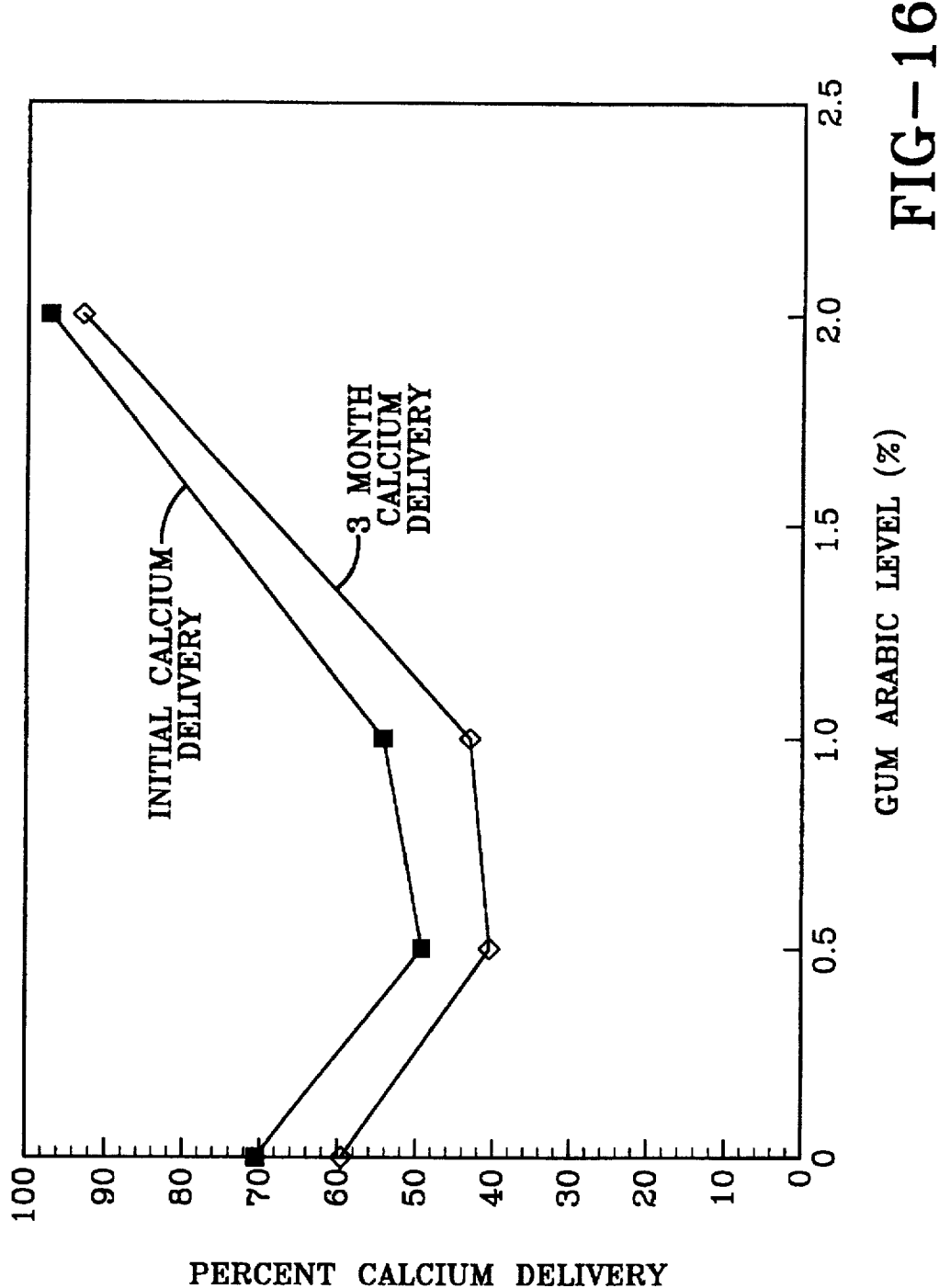
FIG. 16 is a chart showing a comparison of initial and 3 month calcium delivery for microfluidization at different levels of gum arabic.
Figure 17:
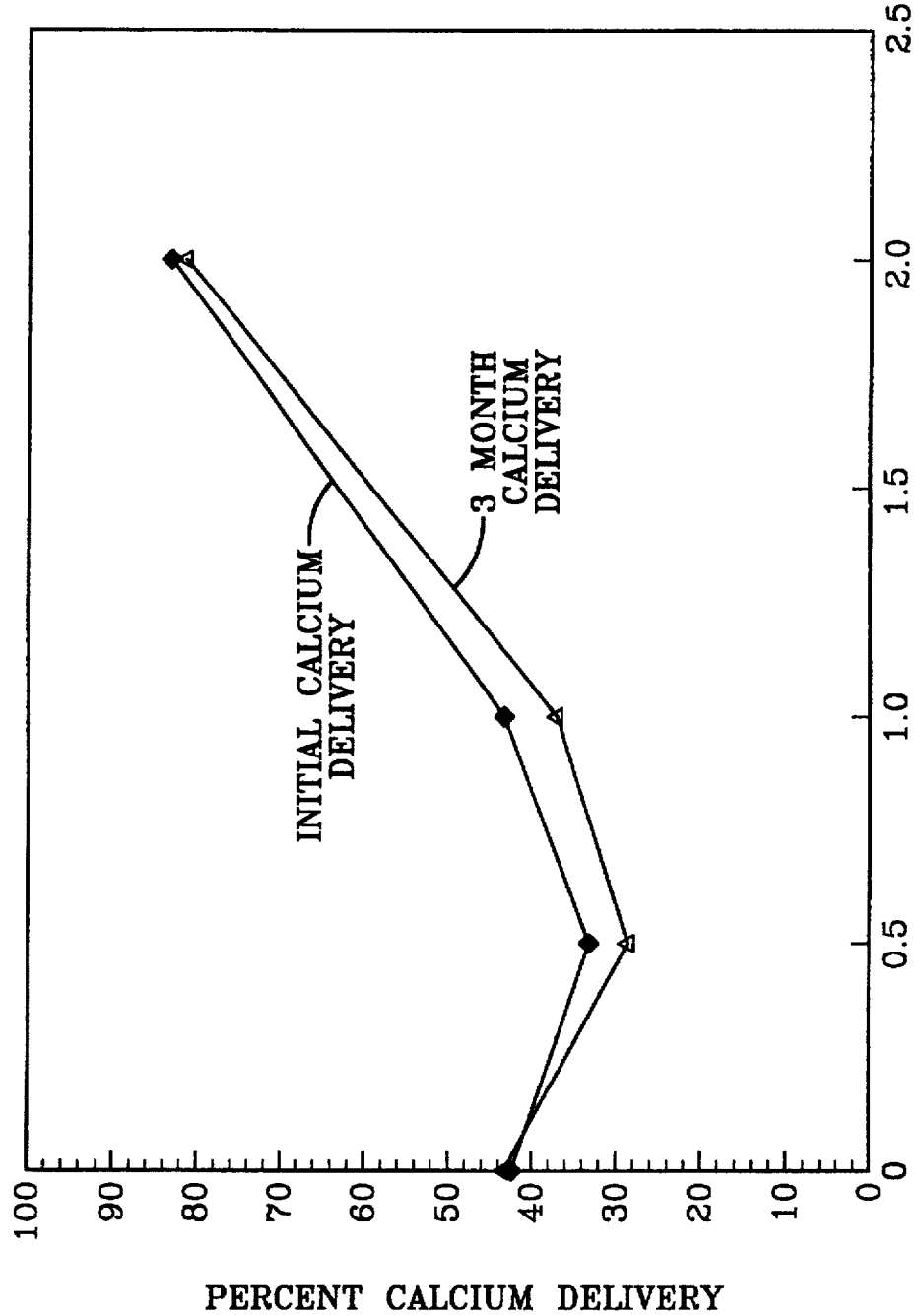
FIG. 17 is a chart showing a comparison of initial and 3 month calcium delivery for traditional homogenization at different levels of gum arabic.
Figure 18:
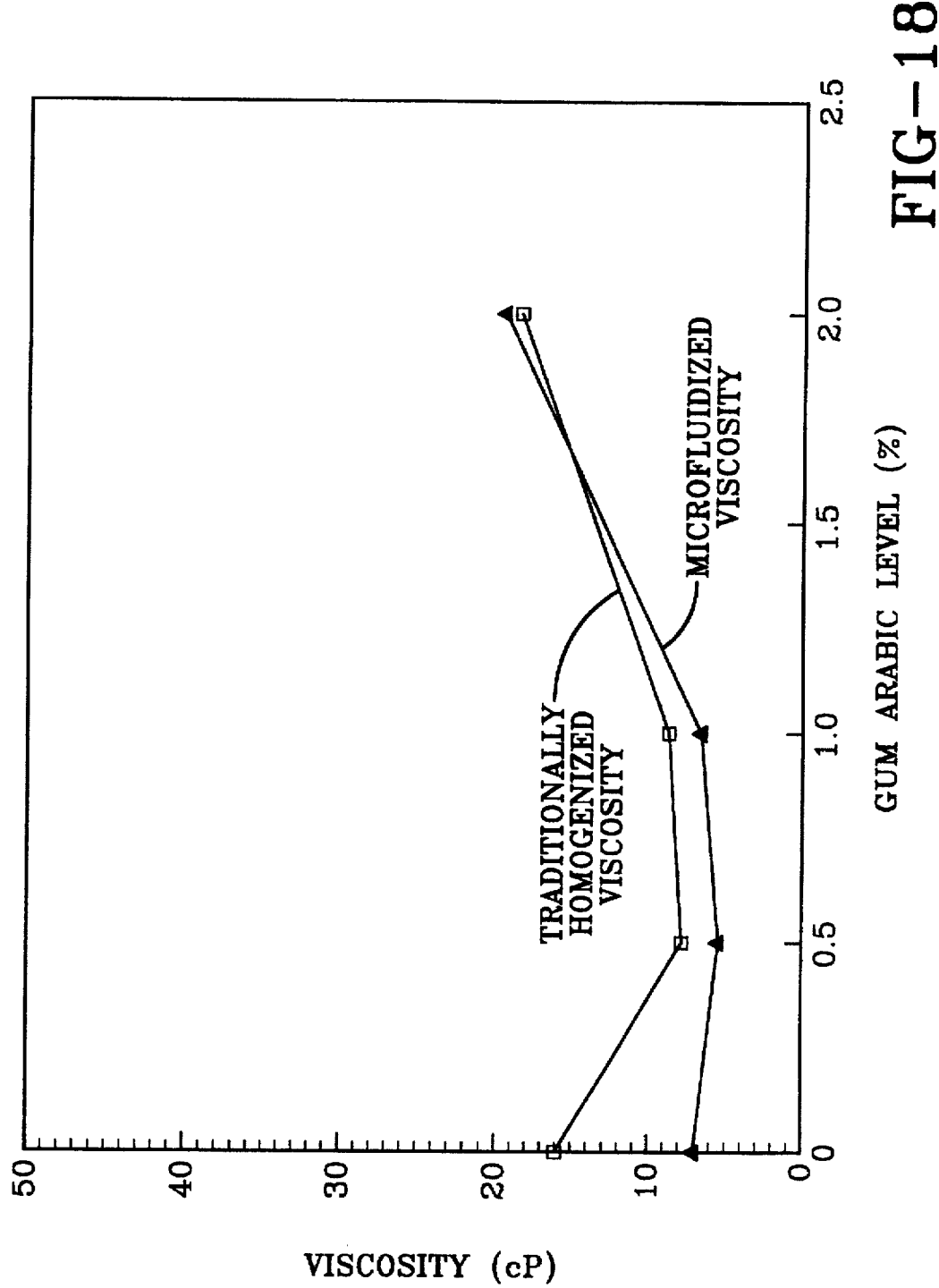
FIG. 18 is a chart showing a comparison of initial viscosity for microfluidization and traditional homogenization at different levels of gum arabic.

FIGS. 16, 17, and 18 show similar data for batches containing gum arabic as the stabilizer. The gum arabic was also unable to provide acceptable calcium delivery at a viscosity similar to the carrageenan control. In FIGS. 16, 17, and 18, the batches which do not contain any gum arabic are the carrageenan controls.

Figure 19:
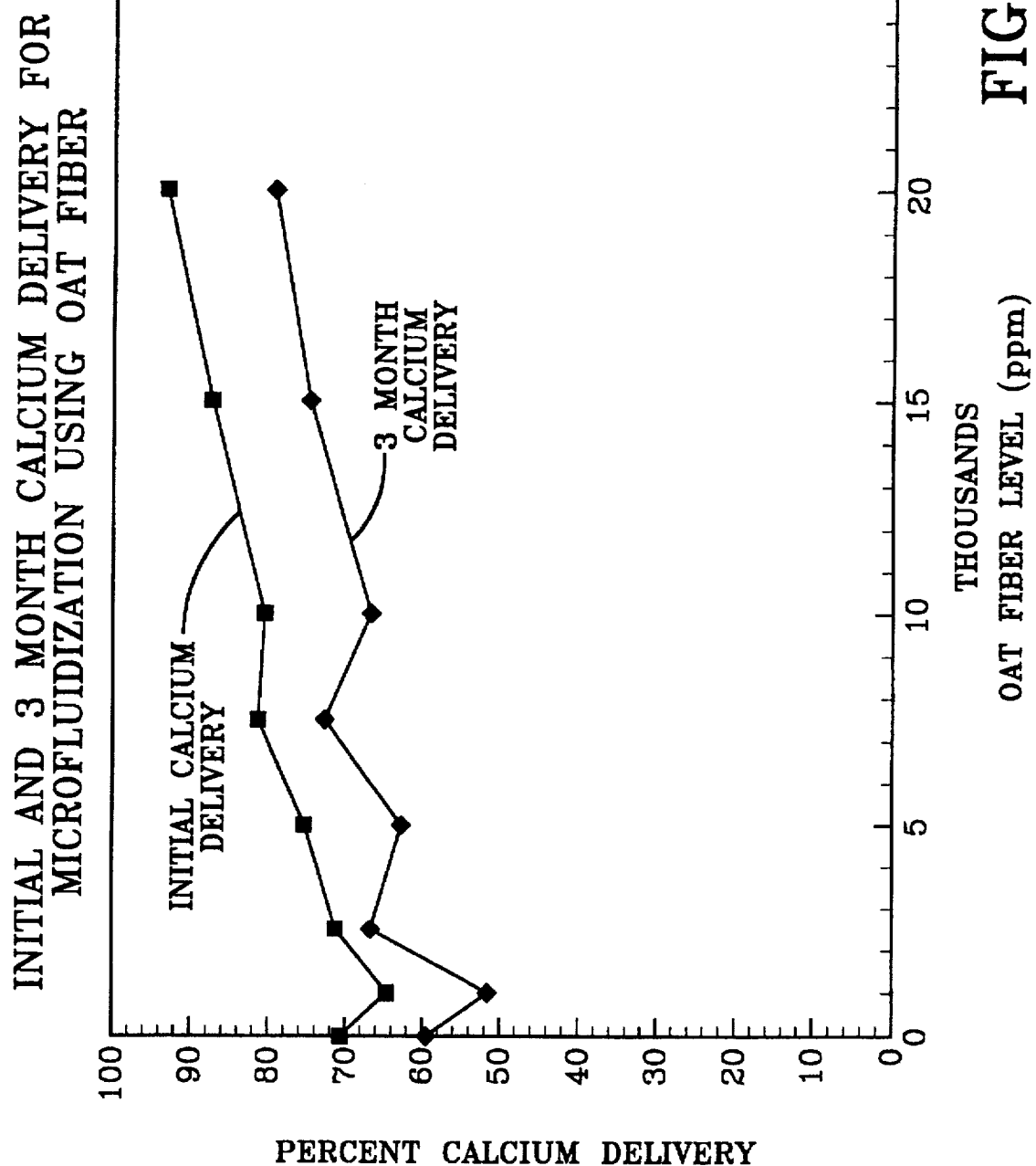
FIG. 19 is a chart showing a comparison of initial and 3 month calcium delivery for microfluidization at different levels of oat fiber.
Figure 20:
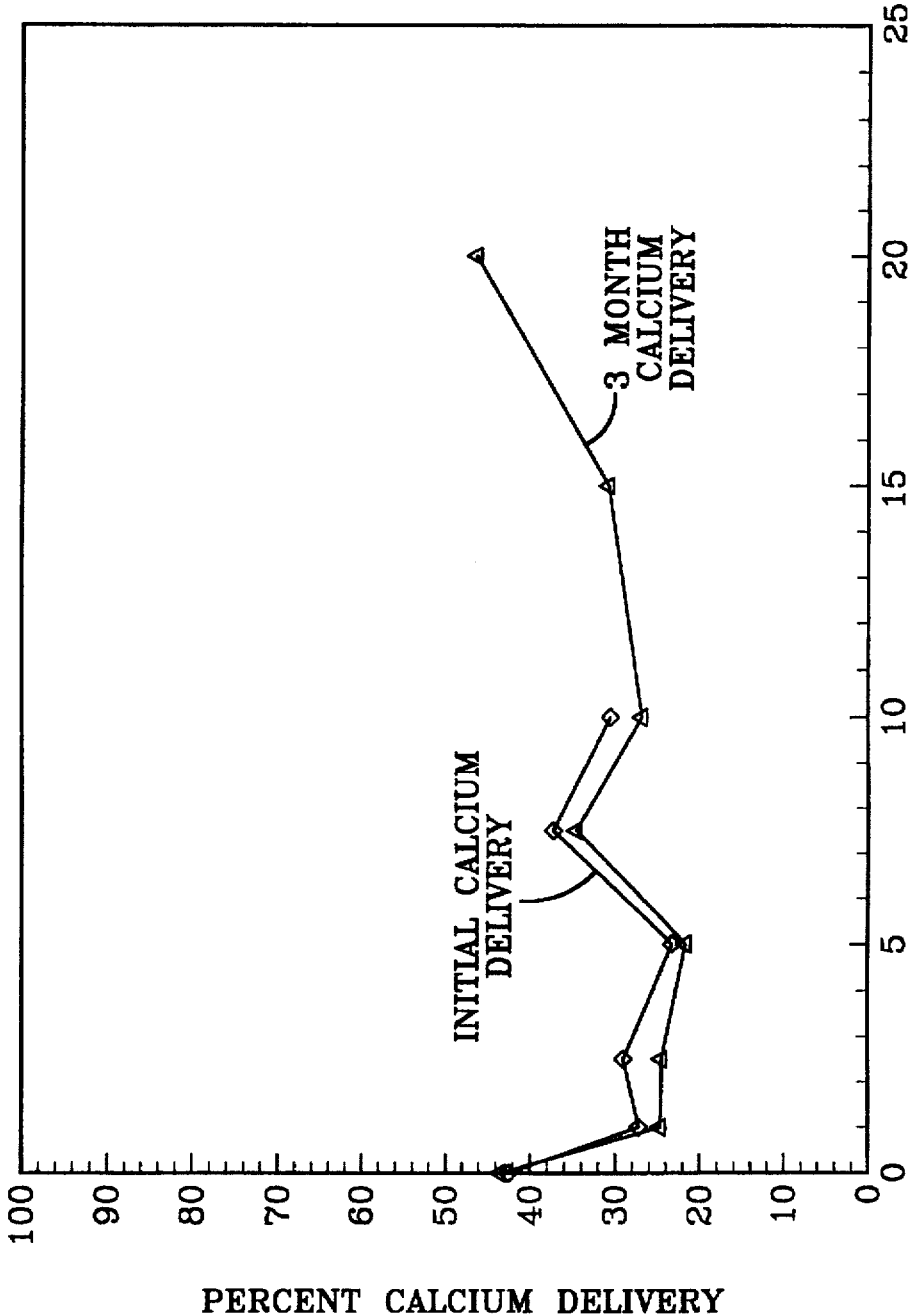
FIG. 20 is a chart showing a comparison of initial and 3 month calcium delivery for traditional homogenization at different levels of oat fiber.
Figure 21:
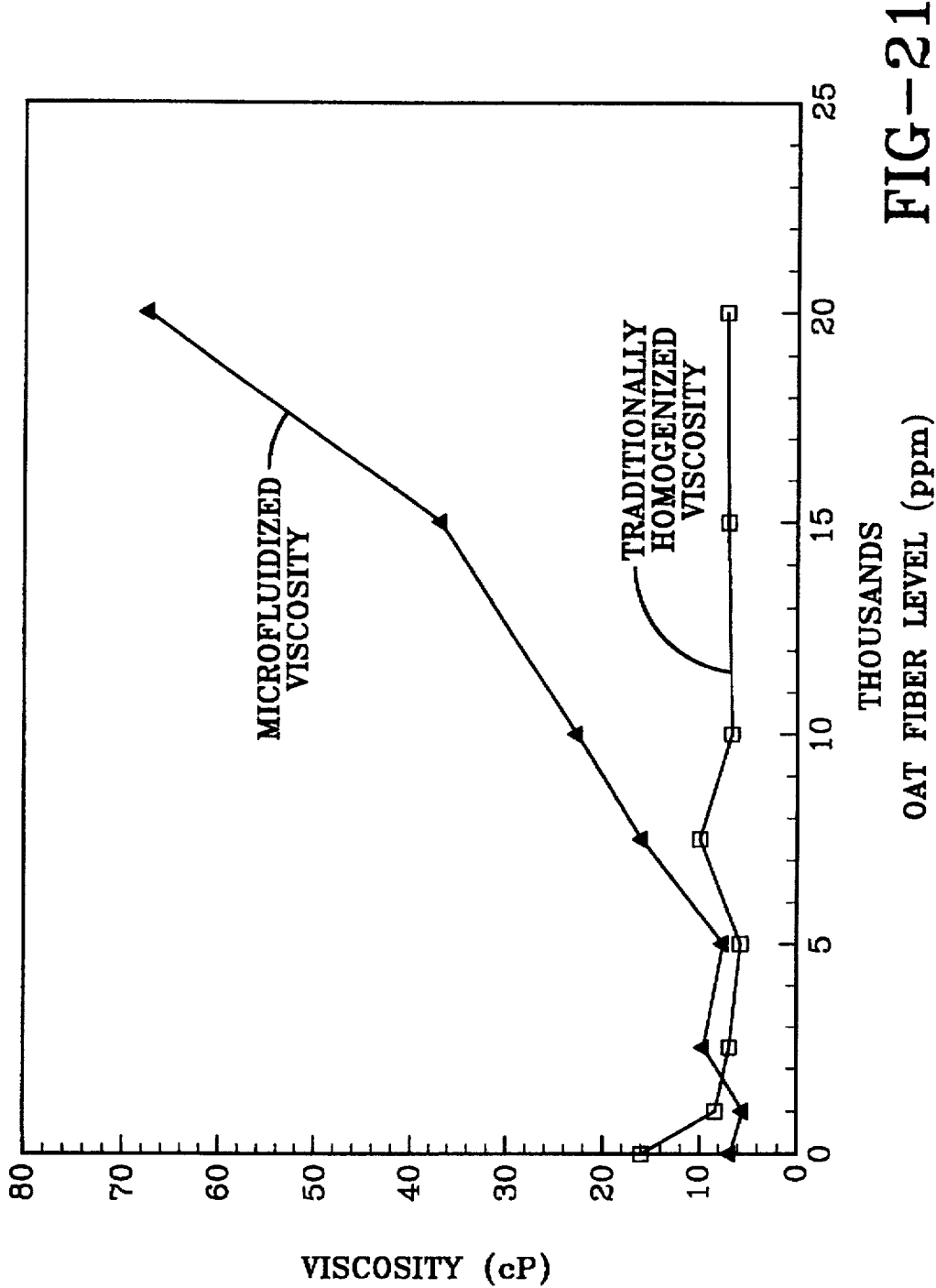
FIG. 21 is a chart showing a comparison of initial viscosity for microfluidization and traditional homogenization at different levels of oat fiber.

FIGS. 19, 20, and 21 show similar data for batches containing oat fiber as the stabilizer. The batches which do not contain any oat fiber are the carrageenan controls. The microfluidized and traditionally homogenized batches show increasing calcuim recovery with increasing levels of oat fiber. While the initial viscosity of both the microfluidized and the traditionally homogenized batches increase with increasing amounts of oat fiber, they do not become unacceptably high. At levels above 2500 ppm oat fiber, the microfluidized batches containing oat fiber did yield acceptable calcium delivery compared to the microfluidized carrageenan control. However, in order to achieve calcium delivery results comparable to the traditionally homogenized carrageenan control (which is shown in FIG. 4), 8000 ppm oat fiber would be needed. In order to achieve calcium delivery results comparable to the microfluidized batch containing 4000 ppm of the nutritional ingredient containing soy polysaccharide initially and at 3 months, about 20,000 ppm oat fiber is needed. However, these high levels of oat fiber were accompanied by an objectionable taste. (In FIG. 20 the initial calcium delivery for 15,000 and 20,000 ppm oat fiber was not measured due to difficulties encountered in pumping the samples.)

The use of a nutritional ingredient containing soy polysaccharide as a source of dietary fiber as a stabilizer in the method of the present invention allows a decrease in the amount of calcium overfortification required and eliminates the need for carrageenan in the product.

While the method of making the liquid nutritional product described herein constitutes a preferred embodiment of this invention, it is to be understood that the invention is not limited to this precise form of apparatus or method and that changes may be made therein without departing from the scope of the invention which is defined in the appended claims.

What is claimed is:

1. A method of manufacturing a stable liquid nutritional product comprising:
    (1) dispersing a protein source in water, thereby forming a protein solution;
    (2) dissolving carbohydrates in water, thereby forming a carbohydrate solution;
    (3) mixing together one or more oils, thereby formnig an oil blend;
    (4) mixing an amount of a nutritional ingredient containing soy polysaccharide which is at least 65% by weight dietary fiber into a mixture selected from the group consisting of the protein solution, the carbohydrate solution, and the oil blend, said amount resulting in from 3000 to 10,000 ppm said nutritional ingredient containing soy polysaccharide in said stable liquid nutritional product;
    (5) combining appropriate quantities of the protein solution, the carbohydrate solution, and solution, and the oil blend to make a combined solution; and
    (6) heat processing and microfluidizing the combined solution.

2. The method of claim 1 further comprising adding carbohydrates to the protein solution.

3. The method of claim 1 further comprising adding minerals to the carbohydrate solution.

4. The method of claim 1 wherein the mixture is the oil blend.

5. The method of claim 1 further comprising adding oil-soluble vitamins to the oil blend.

6. The method of claim 1 wherein the amount of the nutritional ingredient containing soy polysaccharide is less that 6,500 ppm in said liquid nutritional product.

7. The method of claim 6 wherein the amount of the nutritional ingredient containing soy polysaccharide is between 3000 and 6,000 ppm in said liquid nutritional product.

8. The method of claim 1 wherein the nutritional ingredient containing soy polysaccharide has been about 65 to about 75% dry weight total dietary fiber, about 30 about 50% dry weight neutral detergent fiber, about 1 to about 5% dry weight soluble dietary fiber and about 5 to about 15% dry weight cellulose.

9. A method of manufacturing a stable liquid nutritional product containing calcium comprising:
    (1) dispersing a protein source in water, thereby forming a protein solution;
    (2) dissolving carbohydrates in water, thereby forming a carbohydrate solution;
    (3) mixing together one or more oils, thereby forming an oil blend;
    (4) adding a calcium-containing compound to the carbohydrate solution;
    (5) mixing an amount of a nutritional ingredient containing soy polysaccharide which is at least 65% by weight dietary fiber into a mixture selected from the group consisting of the protein solution, the carbohydrate solution, and the oil blend, wherein said amount resulting in from 3,000 to 10,000 ppm of said nutritional ingredient containing soy polysaccharide in said stable liquid nutritional product;
    (6) combining appropriate quantities of the protein solution, the carbohydrate solution, and the oil blend to make a combined solution;
    (7) hearing processing and microfluidizing the combined solution; and
    (8) diluting the combined solution to form a final product, the final product having an initial calcium delivery of at least about 75% of the calcium added in step 4.

10. The method of claim 9 further comprising adding carbohydrates to the protein solution.

11. The method of claim 9 further comprising adding minerals to the carbohydrate solution.

12. The method of claim 9 wherein the mixture is the oil blend.

13. The method of claim 9 wherein the amount of the nutritional ingredient containing soy polysaccharide is more than 4,000 ppm in the final product.

14. The method of claim 13 wherein the amount of the nutritional ingredient containing soy polysaccharide is between 6,500 and 9,500 ppm in the final product.

15. The method of claim 9 wherein the amount of nutritional ingredient containing soy polysaccharide is less than 6,500 ppm in the final product.

16. The method of claim 15 wherein the amount of the nutritional ingredient containing soy polysaccharide as a source of dietary fiber is between 3,000 and 6,000 ppm in the final product.

17. The method of claim 9 wherein the final product has an initial calcium delivery of at least about 90% of the calcium added in step 4.

18. The method of claim 9 wherein the nutritional ingredient containing soy polysaccharide as a source of dietary fiber has about 65 to about 75% dry weight total dietary fiber, about 30 to about 50% dry weight neutral detergent fiber, about 1 to about 5% dry weight soluble dietary fiber and about 5 to about 15% dry weight cellulose.

19. A liquid nutritional product comprising protein, carbohydrates and oils, said liquid nutritional product made by a process comprising:
    (1) preparing a protein solution, a carbohydrate solution and an oil blend;
    (2) adding a nutritional ingredient containing soy polysaccharide which is at least 65% by weight dietary fiber to the protein solution, the carbohydrate solution, the oil blend, or mixtures thereof; and
    (3) combining appropriate quantities of the protein solution, the carbohydrate solution and the oil blend to make a combined solution; the improvement characterized in that the combined solution is subjected to microfluidization.

20. The liquid nutritional of claim 19 further characterized in that said nutritional ingredient containing soy polysaccharide is present in the combined solution at a level of 3,000 to 10,000 ppm.

* * * * *